United States Patent
Abramov et al.

(10) Patent No.: US 12,151,962 B2
(45) Date of Patent: Nov. 26, 2024

(54) APPARATUS AND METHOD FOR CONTROLLING SUBSTRATE THICKNESS

(71) Applicant: CORNING INCORPORATED, Corning, NY (US)

(72) Inventors: Anatoli Anatolyevich Abramov, Painted Post, NY (US); Anping Liu, Horseheads, NY (US); Michael Yoshiya Nishimoto, Horseheads, NY (US); William Anthony Whedon, Corning, NY (US); Jae Hyun Yu, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 797 days.

(21) Appl. No.: 16/977,975

(22) PCT Filed: Mar. 5, 2019

(86) PCT No.: PCT/US2019/020781
§ 371 (c)(1),
(2) Date: Sep. 3, 2020

(87) PCT Pub. No.: WO2019/173358
PCT Pub. Date: Sep. 12, 2019

(65) Prior Publication Data
US 2021/0053858 A1    Feb. 25, 2021

Related U.S. Application Data

(60) Provisional application No. 62/639,197, filed on Mar. 6, 2018.

(51) Int. Cl.
| | | |
|---|---|---|
| C03B 17/06 | (2006.01) | |
| G02B 26/02 | (2006.01) | |
| G02B 27/09 | (2006.01) | |

(52) U.S. Cl.
CPC ............ *C03B 17/064* (2013.01); *G02B 26/02* (2013.01); *G02B 27/0955* (2013.01)

(58) Field of Classification Search
CPC ..... C03B 17/064; C03B 17/068; C03B 17/06; G02B 26/02; G02B 27/0955; G02B 27/0988
See application file for complete search history.

(56) References Cited

U.S. PATENT DOCUMENTS

| | | | |
|---|---|---|---|
| 3,682,609 | A | 8/1972 | Dockerty |
| 4,188,200 | A | 2/1980 | Horn |
| (Continued) | | | |

FOREIGN PATENT DOCUMENTS

| | | | | |
|---|---|---|---|---|
| CN | 1574216 | * | 2/2005 | ....... H01L 21/02686 |
| CN | 1574216 A | * | 2/2005 | ....... H01L 21/02686 |
| (Continued) | | | | |

OTHER PUBLICATIONS

Japanese Patent Application No. 2020-546889, Office Action, dated Nov. 2, 2022, 6 pages (6 pages of English Translation and 6 pages of Original Copy); Japanese Patent Office.

(Continued)

*Primary Examiner* — Joseph P Martinez
*Assistant Examiner* — Ray Alexander Dean
(74) *Attorney, Agent, or Firm* — Ryan T. Hardee; Grant A. Gildehaus

(57) ABSTRACT

A control apparatus for controlling a thickness of a substrate, such as a glass ribbon. The control apparatus comprises a laser assembly and a shielding assembly. The laser assembly generates an elongated laser beam traveling in a propagation direction along an optical path. The shielding assembly comprises at least one shield selectively disposed in the optical path. The shield is configured to decrease an optical intensity of a region of the elongated laser beam. The (Continued)

shielding assembly is configured to change an intensity profile of the elongated laser beam from an initial intensity profile to a targeted intensity profile. A desired targeted intensity profile can be dictated by an arrangement of the shield(s) relative to the optical path, and can be selected to affect a temperature change at portions of the substrate determined to benefit from a reduction in thickness.

19 Claims, 23 Drawing Sheets

(56) References Cited

U.S. PATENT DOCUMENTS

| | | | |
|---|---|---|---|
| 6,327,875 B1 * | 12/2001 | Allaire | B23K 26/073 219/121.79 |
| 7,516,628 B2 | 4/2009 | Chen et al. | |
| 8,196,431 B2 | 6/2012 | Burdette et al. | |
| 8,904,822 B2 * | 12/2014 | LeBlanc | C03B 17/064 65/29.21 |
| 9,302,346 B2 | 4/2016 | Abramov et al. | |
| 2002/0040892 A1 | 4/2002 | Koyama et al. | |
| 2002/0045811 A1 | 4/2002 | Kittrell et al. | |
| 2005/0121427 A1 | 6/2005 | Mikata et al. | |
| 2007/0275338 A1 * | 11/2007 | Acker | C03B 33/091 432/9 |
| 2009/0217705 A1 | 9/2009 | Filippov et al. | |
| 2009/0314032 A1 | 12/2009 | Tomamoto et al. | |
| 2010/0326138 A1 | 12/2010 | Kumatani et al. | |
| 2011/0289969 A1 | 12/2011 | Delia et al. | |
| 2013/0247616 A1 | 9/2013 | Ahrens et al. | |
| 2014/0085426 A1 * | 3/2014 | Leone | G02B 26/0833 348/46 |
| 2014/0123703 A1 * | 5/2014 | LeBlanc | C03B 17/064 65/102 |
| 2016/0176746 A1 * | 6/2016 | Hunzinger | C03B 23/02 65/53 |
| 2017/0050346 A1 * | 2/2017 | Turkaslan | B29C 48/355 |
| 2017/0158551 A1 * | 6/2017 | Bookbinder | B23K 26/50 |
| 2017/0225994 A1 * | 8/2017 | Buellesfeld | C03B 17/064 |
| 2018/0037490 A1 * | 2/2018 | Rossmeier | C03B 33/0235 |
| 2018/0194665 A1 * | 7/2018 | Buckley | C03B 33/09 |

FOREIGN PATENT DOCUMENTS

| | | | | |
|---|---|---|---|---|
| CN | 103676461 | * | 3/2014 | B23K 26/037 |
| CN | 103676461 A | * | 3/2014 | B23K 26/037 |
| CN | 104203846 A | | 12/2014 | |
| DE | 10128636 C1 | * | 8/2002 | C03B 15/02 |
| JP | 07-105566 A | | 4/1995 | |
| JP | H07335516 A | * | 12/1995 | |
| JP | 2000-281371 A | | 10/2000 | |
| JP | 2013-508248 A | | 3/2013 | |
| JP | 2015-536895 A | | 12/2015 | |
| JP | 2017-137237 A | | 8/2017 | |
| KR | 10-2004-0008215 A | | 1/2004 | |
| TW | 464578 B | | 11/2001 | |
| WO | 2011/047008 A1 | | 4/2011 | |
| WO | 2011/066064 A2 | | 6/2011 | |
| WO | 2013/082360 A1 | | 6/2013 | |
| WO | 2016/011094 A1 | | 1/2016 | |
| WO | WO-2017091529 A1 | * | 6/2017 | B23K 26/0846 |

OTHER PUBLICATIONS

Chinese Patent Application No. 201980030529.9, Office Action, dated Apr. 22, 2022, 20 pages (12 pages of English Translation and 8 pages of Original Document), Chinese Patent Office.

International Search Report and Written Opinion of the International Searching Authority; PCT/US2019/020781; mailed on Jun. 13, 2019, 7 pages; European Patent Office.

* cited by examiner

APPARATUS AND METHOD FOR CONTROLLING SUBSTRATE THICKNESS

CROSS-REFERENCE TO RELATED APPLICATIONS

This application is a national stage entry of International Patent Application Serial No. PCT/US2019/020781, filed on Mar. 5, 2019, which in turn, claims the benefit of priority under 35 U.S.C. § 119 of U.S. Provisional Application Ser. No. 62/639,197 filed on Mar. 6, 2018, the contents of each of which are is relied upon and incorporated herein by reference in their entireties.

BACKGROUND

Field

The present disclosure generally relates to apparatuses and methods for making substrates such as glass. More particularly, it relates to apparatuses and methods for controlling the thickness of glass substrates in glass making processes.

Technical Background

For a variety of applications, the close control of the thickness of manufactured substrates can be important. For example, diverse procedures have been implemented and proposed for controlling thickness variations that can occur in liquid crystal display (LCD) glass (or glass for other display types) manufactured by a fusion downdraw method and other glass production methods causing variations in the thickness of the glass ribbon. Thermo-mechanical and glass flow conditions can be uneven across the entirety or portions of a width of the glass ribbon as it is being formed in the fusion downdraw method. Typically, the surface tension at the glass ribbon as it is being formed is inadequate to entirely obviate the variations that can occur in the thickness of the glass ribbon. Although the variations may be a few microns in size, the consequences of such variations can be significant with respect to display glass end use applications for example.

A conventional technique for addressing glass ribbon thickness variations entails placement of a high thermal conductivity plate near the glass ribbon at a location where a temperature of the glass ribbon is at its softening point. A bank of tubes are arranged behind the plate, each ejecting a cooling fluid onto the plate. The objective is to generate thermal gradients across the glass ribbon, perpendicular to the direction of glass travel. These thermal gradients change the localized viscosity of the glass, and thus local thickness, from the downward pull force. The fluid flow from each tube is individually controllable. By adjusting the fluid flow from the tubes, the local temperature on the front face of the plate can be controlled. This local temperature affects the local heat loss, and thus the local temperature of the molten glass, which, in turn, affects the final thickness distribution across the width of the ribbon. For example, if a thickness trace of the glass ribbon indicates that a particular area across the width of the glass ribbon is thicker than desired, the thickness trace is corrected by cooling zones of the glass ribbon adjacent to the thicker area (e.g., cooling the thinner zones by delivering the cooling fluid through the tubes corresponding with the thinner zones, and not delivering the cooling fluid through the tube(s) corresponding with the thicker area).

While well accepted, the glass thickness control techniques described above may not be able to generate a high resolution temperature gradient meeting rigorous thickness uniformity specifications. Other concepts, such as heating small segments of the glass ribbon with a conventional spot-type laser beam scanned across the glass ribbon are cost prohibitive and can entail complex mechanisms ill-suited for high temperature environments, such as those associated with glass ribbon production.

Accordingly, alternative apparatuses and methods for controlling a thickness of a substrate, such as a continuously moving a glass ribbon in a glass manufacturing process, are disclosed herein.

SUMMARY

Some embodiments of the present disclosure relate to a control apparatus for controlling a thickness of at least a portion of a substrate, such as a glass ribbon. The control apparatus comprises a laser assembly and a shielding assembly. The laser assembly is configured to generate an elongated laser beam traveling in a propagation direction along an optical path. The elongated laser beam has a shape in a plane perpendicular to the propagation direction, and the shape of the elongated laser beam defines a major axis. The shielding assembly comprises a shield selectively disposed in the optical path. The shield is configured to decrease an optical intensity of a region of the elongated laser beam. The shielding assembly is configured to change an intensity profile of the elongated laser beam across the major axis from an initial intensity profile to a targeted intensity profile. In some embodiments, the shielding assembly generates the targeted intensity profile to have one or more regions of elevated optical intensity, and one or more regions of reduced optical intensity (including zero laser energy or power). A laser energy or power of the region(s) of elevated optical intensity is sufficient to raise a temperature and reduce a viscosity of a substrate, such as glass ribbon, in a viscous state; the laser energy or power of the region(s) of reduced optical intensity is not sufficient to raise a temperature and reduce a viscosity of the substrate in the viscous state. In some embodiments, the shielding assembly includes two or more shields and an actuator associated with each of the shields for articulating respective ones of the shields into and out of the optical path.

Yet other embodiments of the present disclosure relate to a system for forming a glass ribbon. The system comprises a glass forming apparatus and a control apparatus. The glass forming apparatus is configured to produce a glass ribbon. The control apparatus comprises a laser assembly and a shielding assembly. The laser assembly is configured to generate an elongated laser beam traveling in a propagation direction along an optical path. The elongated laser beam has a shape in a plane perpendicular to the propagation direction. The shape of the elongated laser beam defines a major axis. The shielding assembly comprises a shield selectively disposed in the optical path (i.e., the shielding assembly permits for or facilitates operational arrangements in which the shield is disposed or located in the optical path and for other operational arrangements in which the shield is not disposed or located in the optical path). The shield is configured to decrease an optical intensity of a region of the elongated laser beam. The shielding assembly is configured to change an intensity profile of the elongated laser beam across the major axis from an initial intensity profile to a targeted intensity profile. The control apparatus is configured to control and direct the elongated laser beam with the targeted intensity profile onto the glass ribbon to decrease a thickness of a portion of the glass ribbon.

Yet other embodiments of the present disclosure relate to a method for controlling a thickness of at least one preselected portion of a substrate, such as a glass ribbon. The method comprises generating an elongated laser beam traveling in a propagation direction. The elongated laser beam comprises a shape in a plane perpendicular to the propagation direction. The shape defines a major axis. The elongated laser beam further comprises an intensity profile across the major axis. A region of the elongated laser beam is shielded to change the intensity profile from an initial intensity profile to a targeted intensity profile. The targeted intensity profile comprises a first region and a second region, and an optical intensity of the second region is less than an optical intensity of the first region. The elongated laser beam with the targeted intensity profile is directed onto the substrate. In this regard, the first region corresponds with a first portion of the substrate and the second region corresponds with a second portion of the substrate to cause a reduction in the thickness of the substrate at the first portion. In some embodiments, the method further comprises monitoring a thickness of the substrate and manipulating shields relative to the optical path to generate the targeted intensity profile as a function of the monitored thickness.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
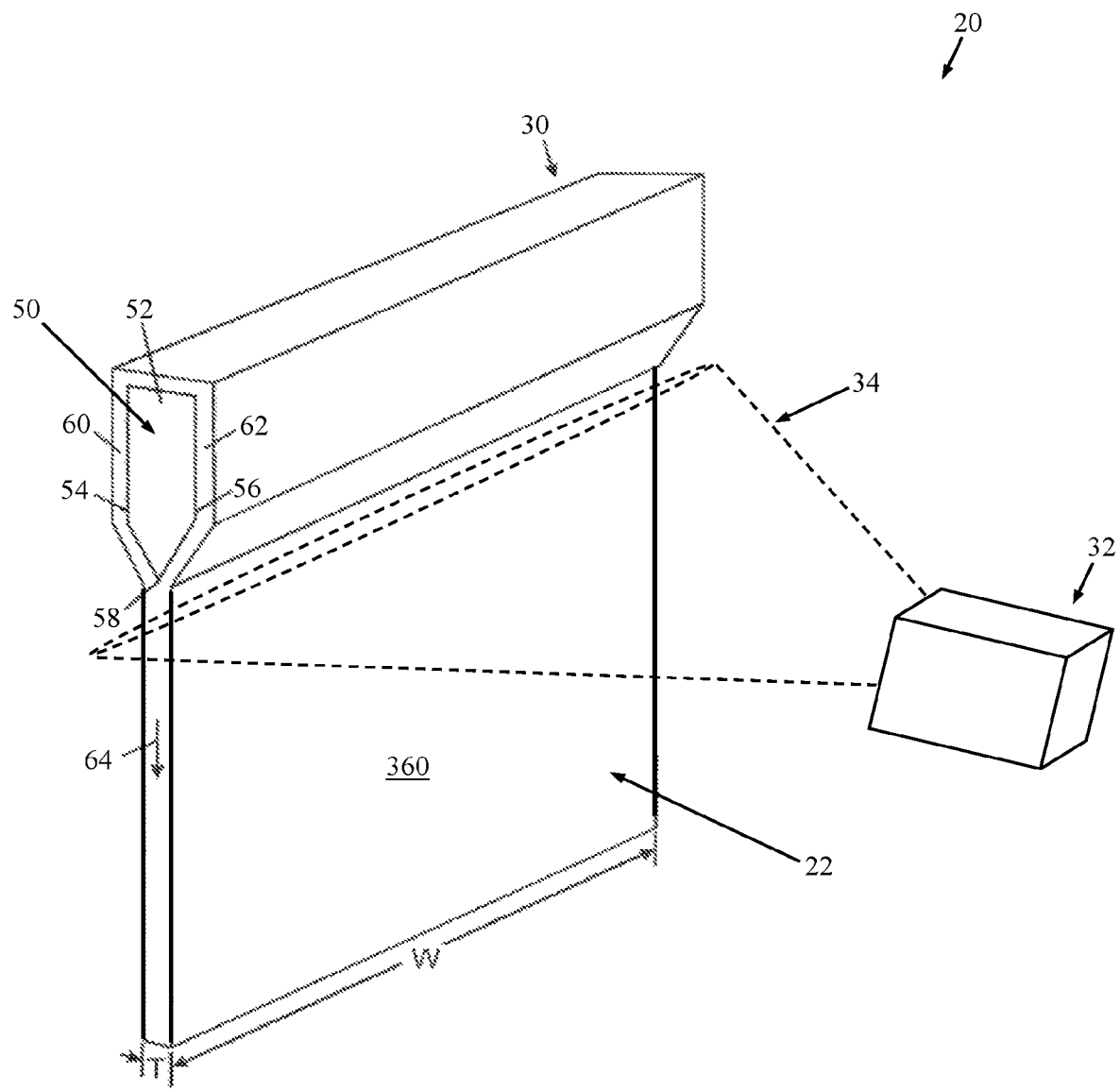
FIG. 1 is a schematic perspective view of a portion of a glass manufacturing system, including a glass forming apparatus and a control apparatus in accordance with principles of the present disclosure, the system operating to generate a glass ribbon.

Reference will now be made in detail to various embodiments of apparatuses and methods for controlling a thickness of a substrate, such as a glass ribbon and glass manufacturing operations. Whenever possible, the same reference numerals will be used throughout the drawings to refer to the same or like parts.

It can be the case in the production of a substrate such as a glass or plastic substrate for example that the thickness of the substrate that is produced is non-uniform. The non-uniformity can be localized, in which case the non-uniformity would be present at a somewhat discrete portion of the substrate as viewed across the width. On the other hand, a plurality of non-uniformities can exist, even in some cases across the entire width of the substrate.

It is usually the case that in the production of a substrate, such as glass or plastic substrate for example, that particular thickness non-uniformities in the substrate, if not corrected, will continue to be manifested as the substrate is continued to be produced. According some aspects of the present disclosure, these thickness non-uniformities are identified and pre-selected for attention so that the non-uniformities can be essentially eliminated in the subsequently-produced substrate. The correction of the thickness non-uniformities is accomplished by increasing the temperature and decreasing the viscosity of the portion(s) of the substrate at which the non-uniformities are present, while the substrate is in a viscous state. As a result, the respective thickness of each non-uniform portion of the substrate is made uniform in the subsequently-produced substrate as described in greater detail below.

A substrate is considered to be in a viscous state so long as its viscosity is such that the response of the substrate to the application of a stress is intermediate the behavior of a pure liquid and an elastic solid. Whenever the response of the substrate is that of an elastic solid, the thickness of the substrate is considered to be "fixed" as that term is used and applied herein.

Some aspects of the present disclosure provide glass ribbon production systems in which a continuously formed glass ribbon is subjected to conditions that promote control or correction of thickness non-uniformities. Although the systems, apparatuses and methods are described herein as being useful with glass ribbons or glass sheets, the systems, apparatuses and methods of the present disclosure can also be employed with other substrates such as plastic substrates. With this mind, FIG. 1 illustrates one embodiment of a system 20 in accordance with principles of the present disclosure and useful in forming a glass ribbon 22 having a width W and a thickness T. The system 20 includes a glass forming apparatus, indicated generally at 30, and a control apparatus, indicated generally at 32. In general terms, the glass forming apparatus 30 generates the glass ribbon 22, and the control apparatus 32 is operable to correct or address non-uniformities in the thickness T of the glass ribbon 22, such as by directing an elongated laser beam 34 onto the glass ribbon 22. As described in greater detail below, the control apparatus 32 formats the elongated laser beam 34 to have or exhibit a targeted intensity profile at the glass ribbon 22 that varies applied laser energy across the width W.

In some non-limiting embodiments, the glass forming apparatus 30 can be a downdraw glass forming apparatus. Downdraw glass forming processes for manufacturing glass substrates such as the glass ribbon 22 and employing equipment such as the glass forming apparatus 30 are sometimes referred to as fusion processes, overflow processes or overflow downdraw processes. The schematic representations of the glass forming apparatus 30 and the control apparatus 32 are referred to herein with respect to the descriptions to follow of aspects, embodiments and examples of methods an apparatuses that concern the control of the thickness of a glass substrate such as the glass ribbon 22 for example.

Included in the embodiment of the glass forming apparatus 30 illustrated in FIG. 1 is a forming body (e.g., wedge) 50 that includes an open channel 52 (referenced generally) and a pair of converging forming surfaces 54, 56 that converge at lower apex that comprises a root 58 of the forming body 50. Molten glass is delivered into the open channel 52 and overflows the walls thereof, thereby separating into two individual flows or streams 60, 62 that flow over the forming surfaces 54, 56. When the separate flows 60, 62 of molten glass reach the root 58, the recombine, or fuse, to form a single ribbon of viscous molten glass (i.e., the glass ribbon 22) that descends from the root 58. At approximately this point the glass ribbon 22 is in a viscous state and the thickness of the glass ribbon 22 has not become fixed so that the thickness of the glass ribbon 22 can be altered according to some aspects of the present disclosure. The glass ribbon 22 is drawn away from the root 58, as indicated by arrow 64. For example, pulling rollers (not shown) or similar devices can be located downstream of the root 58 and operate to apply tension to the glass ribbon 22. The pulling rollers can be positioned sufficiently below the root 58 that the thickness of the glass ribbon 22 is essentially fixed at that location. The pulling rollers draw the glass ribbon 22 downwardly from the root 58 at a prescribed rate that establishes the thickness of the glass ribbon 22 as it is formed at the root 58. Aspects of the present disclosure are equally applicable to other substrate (e.g., glass ribbon) forming techniques, such as a single sided overflow process or a slot draw process, which basic processes are well known to those skilled in the art.

In the aspect illustrated in FIG. 1, the control apparatus 32 is configured to generate and emit the elongated laser beam 34 adequate to increase the temperature and decrease the viscosity of at least one preselected portion of a glass substrate in a viscous state, such as the glass ribbon 22 in a viscous state for example, when the elongated laser beam 34 is directed onto the glass substrate in a viscous state and thereby alter the thickness of the at least one preselected portion of the glass substrate. As illustrated in the aspect of FIG. 1, the elongated profile laser beam 34 is directed to the glass ribbon 22 at a location adjacent the root 58 of the forming body 50 where the glass ribbon 22 is in a viscous state. However, the elongated laser beam 34 can be directed to the glass ribbon 22 at other locations where the glass ribbon 22 is in a viscous state.

In one aspect and depending upon the characteristics of the glass substrate, the viscosity of the glass substrate in a viscous state would be greater than approximately 100,000 poise but not so great that the thickness of the substrate would be fixed. At viscosities greater than 100,000 poise but less than the viscosity of the glass substrate when the thickness is fixed, the application of heat to the glass substrate effectively decreases the viscosity of the glass substrate at the point at which the heat is applied, and the heat is not dissipated in the glass substrate as would occur at lower substrate viscosities.

The adequacy of a laser beam for the purpose of increasing the temperature and decreasing the viscosity of at least one preselected portion of a glass ribbon is a function primarily of the characteristics of the glass ribbon in a viscous state, the wavelength and the power level of the laser beam, and whether an objective is to alter the thickness of a limited or a large number of preselected portions of the glass substrate. For example, according to one aspect, where the glass substrate comprises a single layer, the wavelength of the laser beam can be selected so that the laser beam is substantially absorbed by the glass substrate and does not readily pass through the glass substrate.

Figure 2:
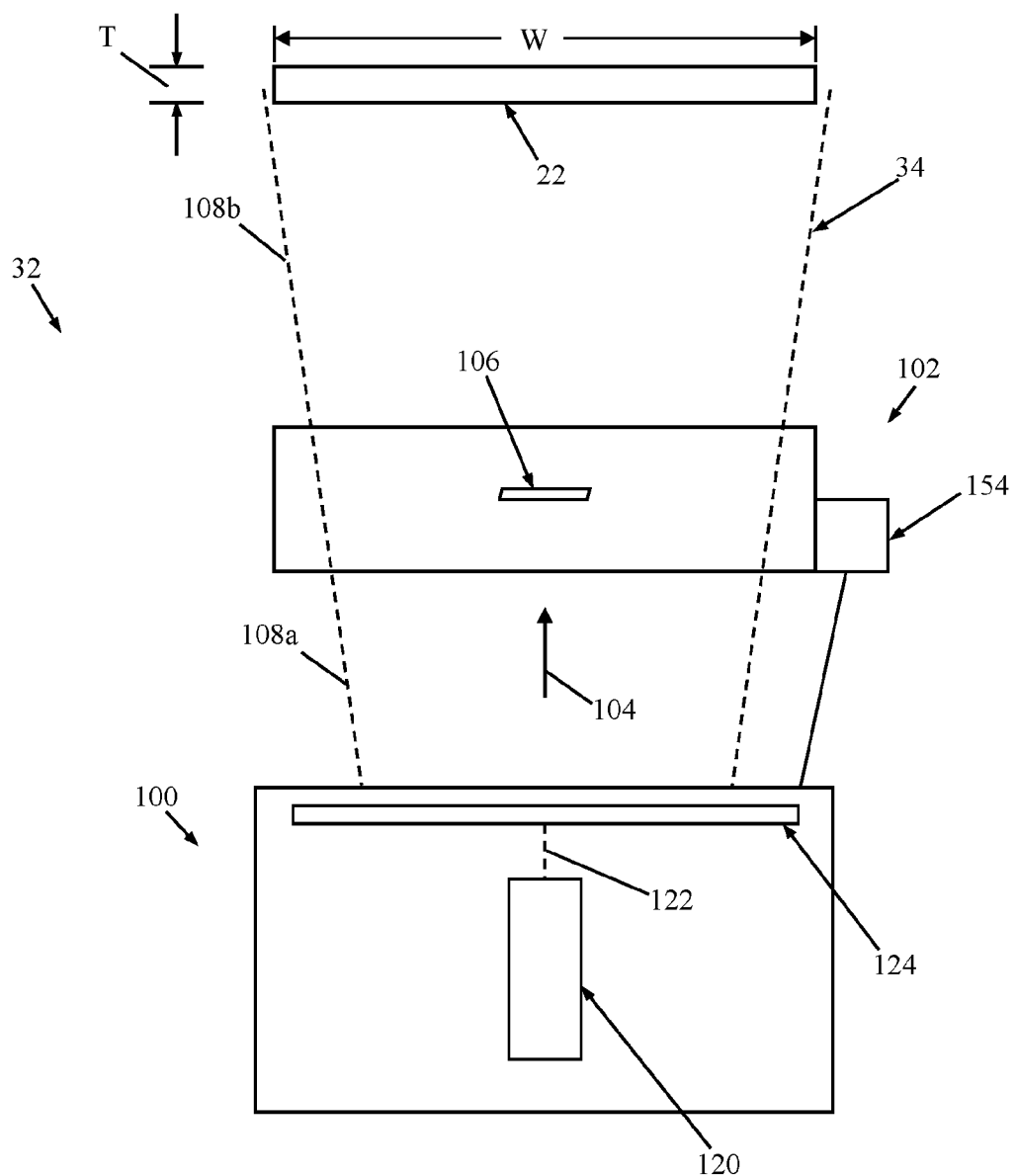
FIG. 2 is a schematic top plan view of the control apparatus and glass ribbon of FIG. 1.

With the above in mind, FIG. 2 illustrates one embodiment of the control apparatus 32 in block form. The control apparatus 32 includes a laser assembly 100 and a shielding assembly 102. In general terms, the laser assembly 100 is configured to generate the elongated laser beam 34 (an outer extent of which is represented by dashed lines) traveling in a propagation direction 104. The shielding assembly 102 includes one or more shields 106 (drawn generally) disposed in an optical path of the elongated laser beam 34 that are each configured to decrease an optical intensity of a portion of the elongated laser beam 34. As a result, an optical intensity profile of the elongated laser beam 34 is altered by the shielding assembly 102 from an initial intensity profile to a targeted intensity profile. In other words, the elongated laser beam 34, as generated by the laser assembly 100, has or exhibits the initial intensity profile optically before or upstream of the shielding assembly 102 (generally identified by the region 108a in FIG. 2). The initial intensity profile is changed to the targeted intensity profile by the shielding assembly 102. The resultant targeted intensity profile thus exists optically after or downstream of the shielding assembly 102 (generally identified by the region 108b in FIG. 2). As described below, the targeted intensity profile of the elongated laser beam 34 is selected to more distinctly affect portions of the glass ribbon 22 designated as having thickness non-uniformities.

Figure 3A:
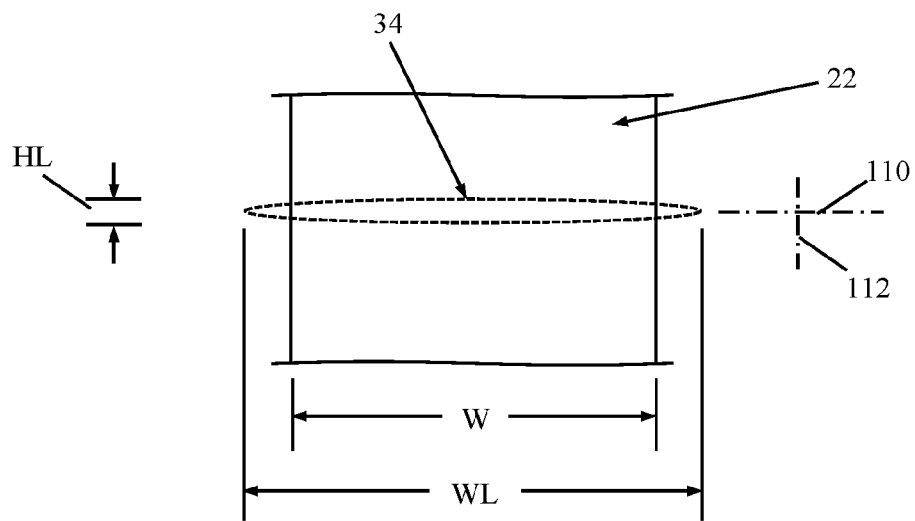
FIG. 3A is a schematic representation of an elongated laser beam generated by the control apparatus of FIG. 1 impinging upon a glass ribbon.

As used throughout this disclosure, a "shape" of the elongated laser beam 34 is in reference to a perimeter shape or extent of the elongated laser beam 34 in a plane perpendicular to the propagation direction 104. The laser assembly 100 is configured to generate the elongated laser beam 34 such that the shape is elongated (e.g., is not a circle). For example, the elongated laser beam 34 can have an elliptical shape in the plane perpendicular to the propagation direction 104 as represented by FIG. 3A. Other elongated shapes are also acceptable that may or may not be or include an ellipse (e.g., the elongated shape can be a line or planar). Regardless, and with cross-reference between FIGS. 2 and 3A, the elongated shape of the elongated laser beam 34 in a plane perpendicular to the propagation direction 104 (that is otherwise into a plane of the page of FIG. 3A) defines a major axis 110 and a minor axis 112 orthogonal to the major axis 110. A width WL of the shape of the elongated laser beam 34 is defined as the dimension along the major axis 110, and a height HL is defined as the dimension along the minor axis 112. It will be understood that the elongated laser beam 34, may experience divergence as it propagates in space, and in some embodiments this divergence is more pronounced along the major axis 110. Thus, the width WL, and optionally the height HL, can vary as a function of the distance between the reference point and the laser assembly 100. However, the laser assembly 100 is configured and arranged relative to the glass ribbon 22 (or other substrate of interest) such that at the point where the elongated laser beam 34 impinges upon the glass ribbon 22, the width:height (WL:HL) aspect ratio of the elongated laser beam 34 is 4:1 or more, optionally 10:1 or more. In some non-limiting embodiments, the width WL of the elongated laser beam 34 at the glass ribbon 22 can be on the order of 60-1000 millimeters (mm), and the height HL can be on the order of 1-4 mm. Other dimensions are also acceptable. FIG. 2 further reflects that in some embodiments, the laser assembly 100 is located such that at the point of impingement on the glass ribbon 22 (or other substrate of interest), the shape of the elongated laser beam 34 spans the entire width W of the glass ribbon 22. For example, where the elongated laser beam 34 diverges from the laser assembly 100 (and/or from the shielding assembly 102), the laser assembly 100 can be located at an appropriate distance from the glass ribbon 22 such that at the point of impingement, the width WL of the elongated laser beam 34 can approximate or can be greater than the width W of the glass ribbon 22. In other embodiments, a configuration of the laser assembly 100 and/or an arrangement of the laser assembly 100 relative to the glass ribbon 22 can be such that the width WL of the elongated laser beam 34 is less than the width W of the glass ribbon 22 at the point of impingement.

Figure 3B:
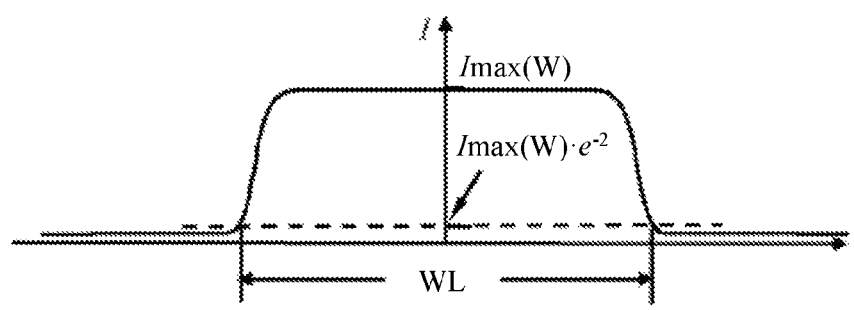
FIG. 3B is a diagram schematically showing the energy intensity profile of an elongated laser beam in a flat-top-mode.

The elongated laser beam 34 can have various energy distribution profiles along the width WL. In general terms, energy distribution profile of the elongate laser beam 34 exhibits a maximal intensity Imax(W) along the width WL; the width WL can be defined as the linear distance in the width direction from the point on one side of the beam having an intensity of $Imax(W) \cdot e^{-2}$ to the point on the opposite side of the beam having an intensity of $Imax(W) \cdot e^{-2}$, where e is Euler's irrational number. In some embodiments, the elongated laser beam 34 can have a non-Gaussian energy distribution profile. For example, the elongated laser beam 34 can have a flat-top-mode distribution along the width WL as schematically illustrated in FIG. 3B. A "flat-top-mode" means the energy intensity distribution of the laser beam along a given direction is substantially non-Gaussian and exhibits a relatively flat top as described, for example, in U.S. Pat. No. 9,302,346 the entire teaching of which are incorporated herein by reference. Other examples of energy distribution profiles useful with the present disclosure include, but are not limited to, a Gaussian energy distribution profile, a D-mode energy distribution profile, etc.

The laser assembly 100 can assume various forms appropriate for generating the elongated laser beam 34 as described above, and includes at least one laser source 120. The laser source 120, as an example, can comprise a high-intensity infrared laser generator such as a carbon dioxide ($CO_2$) laser generator of a type that is available from numerous commercial sources. The wavelengths of the light produced and the power generated by $CO_2$ laser generators are variable and can be selected so that the laser beam generated is adequate to increase the temperature and decrease the viscosity of portions of a glass substrate in a viscous state, such as the glass ribbon 22, sufficiently to correct thickness variations in the glass substrate. For example, a laser beam with a wavelength from approximately 9.4 micrometers to approximately 10.6 micrometers and a power output of thousands of watts can be suitable for increasing the temperature and decreasing the viscosity of portions of a glass substrate in a viscous state such as the glass ribbon 22. However, because differing glass substrates will absorb laser beams to differing degrees at differing wavelengths, wavelengths outside the range of approximately 9.4 micrometers to approximately 10.6 micrometers can be employed. For example, in other embodiments useful wavelengths that can be employed range from about 1 micrometer to about 11 micrometers, with the laser beam being generated by a variety of different laser sources such as a fiber laser, a solid-state laser, a $CO_2$ laser, a quantum cascaded laser, laser diode, etc. In yet other embodiments, the laser source 120 comprises two or more laser generators, each configured to emit a laser beam with differing properties (e.g., different wavelengths). The combination of at least two wavelengths can facilitate more precise control of temperature across the glass substrate. For example, the elongated laser beam 34 can be generated as a combination of a laser beam emitted from a quantum cascaded laser generator with a wavelength of about 5 micrometers and a laser beam emitted from a $CO_2$ laser generator with a wavelength of about 10.6 micrometers, and can be capable of heating a glass substrate through the thickness thereof more uniformly as compared to a $CO_2$ laser generator-emitted laser beam alone. In this case, the quantum cascaded laser beam portion of the elongated laser beam 34 is absorbed by a thick layer of a glass substrate, while the $CO_2$ laser beam portion of the elongated laser beam 34 is completely depleted after tens of micrometers. By controlling the power ratio of the two laser generators, a variety of temperature profiles can be generated. Localized thermal profile will be able to control thermal tension and compression force in local areas, hence glass local shape can be changed. Other process variables of laser thickness control can include laser exposure time, energy peak width, energy peak height, exposed glass viscosity, laser penetration depth, and glass flow density/flow rate. For example, the control apparatus 32 can be arranged such that the elongated laser beam 34 impinges upon the glass ribbon 22 at a location where the glass ribbon 22 has a viscosity, temperature, thickness or other characteristic(s) appropriate to achieve a desired heat flux depth into the glass ribbon 22. The wave length, size, exposure time, etc., of the elongated laser beam 34 at this selected location may more precisely create the needed viscosity gradient to achieve a desired heat profile and thus thickness change.

Figure 4A:
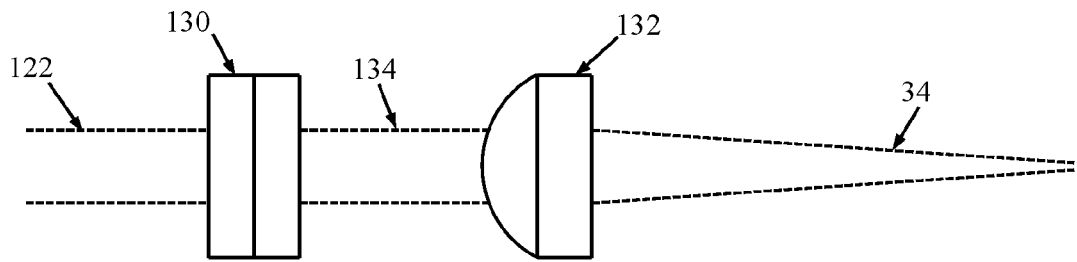
FIG. 4A is a simplified side view of optical components included with a laser assembly useful with the control apparatus of FIG. 1 and transforming an emitted laser beam.
Figure 4B:
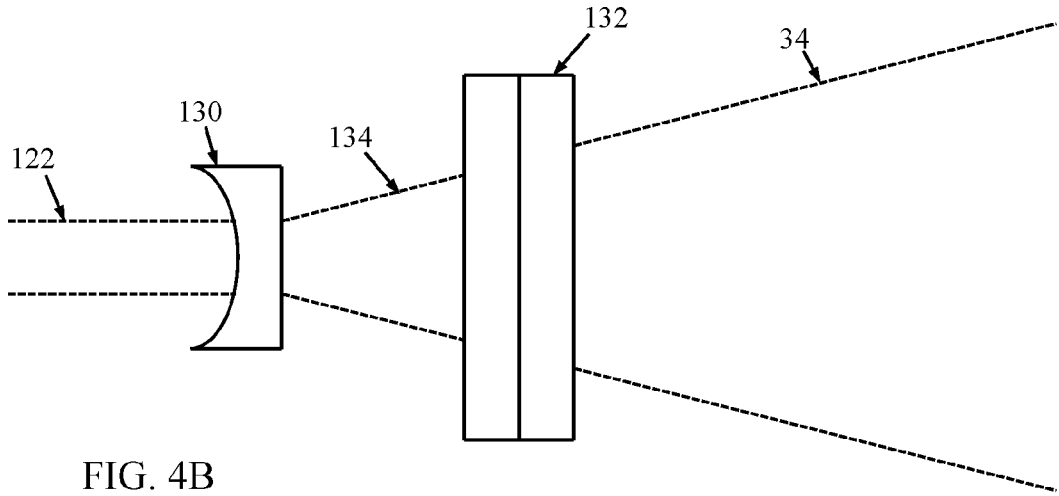
FIG. 4B is a simplified side view of the arrangement of FIG. 4A.
Figure 4C:
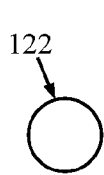
FIGS. 4C-4E are simplified transverse representations of the laser beam propagating through the optical components of FIGS. 4A and 4B.
Figure 4D:
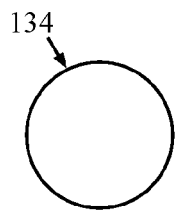
Figure 4E:
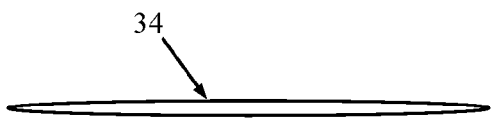

Regardless of an exact construction, the laser source 120 emits a source laser beam 122. In some embodiments, a construction of the laser source 120 is such that the source laser beam 122 has a circular shape or similar shape that is not elongated. With these and related embodiments, the laser assembly 100 can incorporate various configurations for modifying the source laser beam 122 into the elongated laser beam 34. For example, in some optional embodiments the laser assembly 100 further includes one or more optical components 124 arranged in the optical path of the source laser beam 122. Optical components appropriate for transforming a circular beam into an elongated beam shape are known to those of ordinary skill, for example one or more cylindrical and/or aspheric lenses arranged to focus or expand a circular laser beam primarily in one axis. In one non-limiting example of FIGS. 4A and 4B, the optical components 124 can include a cylindrical plano-concave lens 130 and a cylindrical plano-convex lens (e.g., a rectangular cylinder) 132. The source laser beam 122 (emitted from the laser source 120) is incident upon the cylindrical plano-concave lens 130 and is caused to expand (identified as an intermediate laser beam 134 in FIGS. 4A and 4B). The intermediate laser beam 134 is incident upon the cylindrical plano-convex lens 142 and is caused to further expand in primarily one direction, resulting in the elongated laser beam 34. FIGS. 4C-4E provide simplified representations of a shape of the laser beam in a plane perpendicular to the propagation direction 104 as formed by the optical components 132 (i.e., FIG. 4C illustrates the shape of the source laser beam 122 prior to the cylindrical plano-concave lens 130; FIG. 4D illustrates the shape of the intermediate laser beam 134 after the plano-concave lens 130 and prior to the cylindrical plano-convex lens 132; FIG. 4E illustrates the shape of the elongated laser beam 34 after the plano-convex lens 132).

Figure 5:
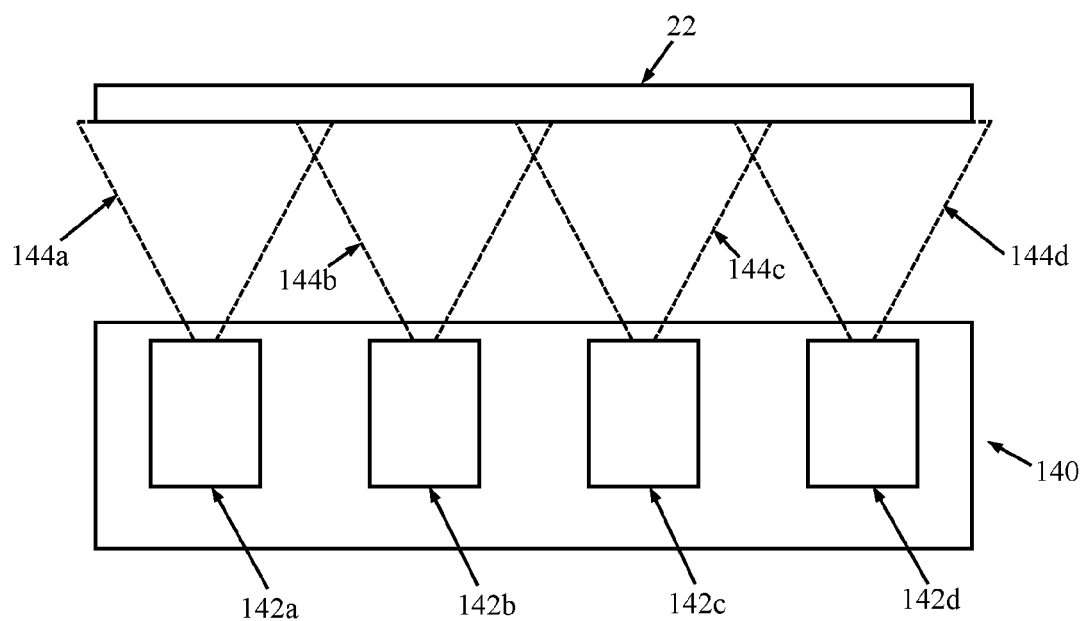
FIG. 5 is a schematic top plan view of another laser assembly useful with the control apparatus of FIG. 1.

Returning to FIG. 2, other optical components appropriate for transforming a circular beam are also acceptable (e.g., one or more aspheric lenses). In yet other embodiments, the elongated laser beam 34 can be generated by a combination of two or more overlapping laser beams. Another example laser assembly 140 in accordance with principles of the present disclosure is shown in FIG. 5. The laser assembly 140 includes a plurality of laser sources, such as laser sources 142a, 142b, 142c, 142d, that each emit a source laser beam (identified as 144a, 144b, 144c, 144d, respectively). The laser sources 142a, 142b, 142c, 142d are arranged relative to one another (e.g., side-by-side) and at an appropriate distance from the glass ribbon 22 (or other substrate) such that the source laser beams 144a, 144b, 144c, 144d overlap one another to collectively form the elongated laser beam 34 at the glass ribbon 22. While FIG. 5 illustrates the laser assembly 140 as including four of the laser sources 142a, 142b, 142c, 142d, any other number, either greater or lesser, is also acceptable. With the example of FIG. 5, the plurality of laser sources can assume various forms appropriate for emitting a line-type source laser beam, such as a beam scanner (e.g., a laser source incorporating a spinning polygonal mirror that creates one long and narrow laser beam).

Returning to FIG. 2, the shielding assembly 102 is generally configured to alter the optical intensity profile of the elongated laser beam 34 across the major axis 110 (FIG. 3A) by selectively inserting the one or more shields or shielding bodies 106 into the optical path. With this in mind, one example of the shielding assembly 102 is shown in greater detail in FIGS. 6A and 6B. The shielding assembly 102 includes the one or more shields 106, a housing 150, one or more actuators 152, and a controller 154. The one or more shields 106 are maintained within the housing 150, and are selectively maneuvered into and out of the optical path of the elongated laser beam 34 by a corresponding one of the actuators 152. Operation of the actuators 152, in turn, is controlled by the controller 154. With this construction, the shielding assembly 102 is operable to create a desired targeted intensity profile in the elongated laser beam 34 as described in greater detail below.

Figure 6A:
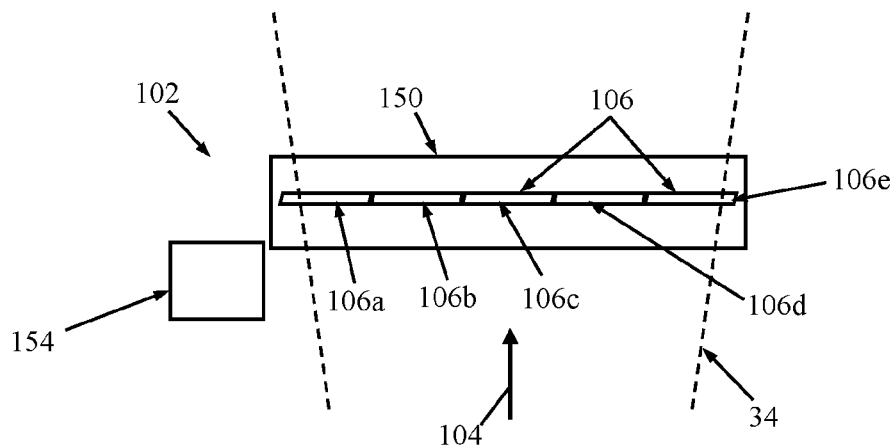
FIG. 6A is a simplified top plan view of a shielding assembly useful with the control apparatus of FIG. 1.
Figure 6B:
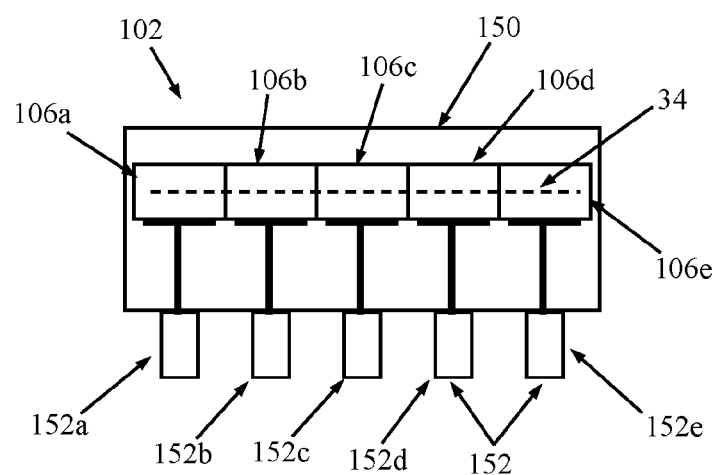
FIG. 6B is a simplified end view of the shielding assembly of FIG. 6A, including a plurality of shields.

In the non-limiting example of FIGS. 6A and 6B, the one or more shields 106 includes first, second, third, fourth and fifth shields 106a, 106b, 106c, 106d, 106e. Any other number, either greater or lesser, is equally acceptable. Where two or more of the shields 106 are provided, the shields 106 can be similar or identical in terms of size, shape and/or material(s), but need not be. Regardless, in some embodiments, each of the shields 106 can be a plate (e.g., a rectangular block) with a perimeter/edge shape selected such that adjacent ones of the shields 106 overlap one another (e.g., the second shield 106b overlaps with the first and third shields 106a, 106c) in a manner preventing the elongated laser beam 34 from passing between adjacent ones of the shields 106 when arranged in the optical path. A material and construction of the each of the shields 106 is configured to partially or completely block, absorb or scatter laser beam energy. For example, each of the shields 106 (or at least a surface of each of the shields 106 positioned to face the incoming elongated laser beam 34) can be formed of a metal, ceramic or composite material appropriate for blocking, absorbing or scattering laser beam energy. Further, at least a surface of each of the shields 106 otherwise positioned to face the incoming elongated laser beam 34 can have small topological features (e.g., pores, ribs, etc.) that scatter the elongated laser beam 34 and disperse the energy of the elongated laser beam 34. In some non-limiting examples, each of the shields 106 (or at least a surface of each of the shields 106 that is otherwise positioned to face the incoming elongated laser beam 34) can be formed of a closed cell or porous metal or ceramic, such as oxidized aluminum, stainless steel, titanium, silicon carbide, etc. A laser shielding material available from Kentek Corp. (Pittsfield, NH) under the trade name Ever-Guard® could be used as one or more of the shields 106.

The housing 150 can assume various forms appropriate for housing and maintaining the shields 106 (and optionally the actuators 152 and other optional components) in an environment of the substrate being acted upon (e.g., the glass ribbon 22 (FIG. 1)). For example, in some embodiments described in greater detail below, the housing 150 can be, or can be akin to, a shroud that provides thermal and/or moisture protection.

Figure 6C:
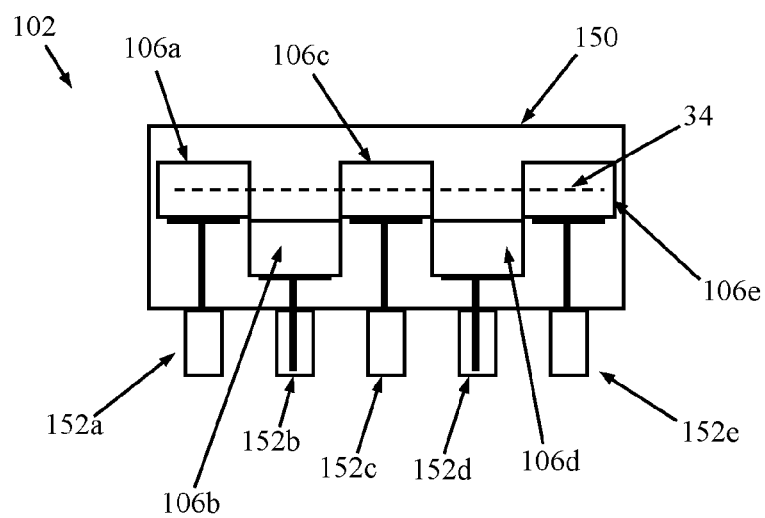
FIG. 6C is the shielding assembly of FIG. 6B with the plurality of shields arranged in a different configuration.
Figure 6D:
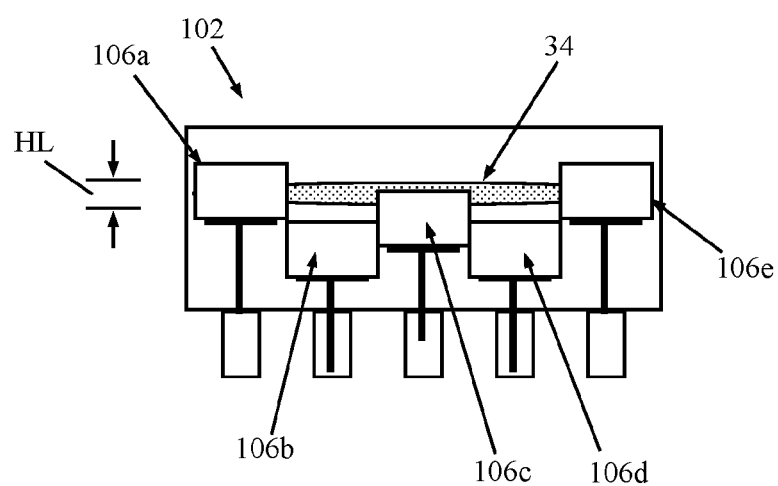
FIG. 6D is the shielding assembly of FIGS. 6B and 6C with the plurality of shields arranged in a different configuration.

In some embodiments, a respective one of the actuators 152 is provided for each of the shields 106. Thus, FIG. 6B illustrates the shielding assembly 102 as including first, second, third, fourth, and fifth actuators 152a, 152b, 152c, 152d, 152e, although any other number corresponding to the number of shields 106 is equally acceptable. In other embodiments, a single one of the actuators 152 can be associated with two (or more) of the shields 106. Each of the actuators 152 can have a mechanical and/or pneumatic configuration appropriate for at least moving the corresponding shield 150 into and out of the optical path of the elongated laser beam 34. In the non-limiting example of FIG. 6B, each of the actuators 152 is configured to raise and lower the corresponding shield 106 (e.g., the first actuator 152a operates to raise and lower the first shield 106a, etc.). As a point of reference, in the view of FIG. 6B, each of the first-fifth actuators 152a-152e is operating to locate the corresponding shield 106a-106e in the optical path of the elongated laser beam 34; in the view of FIG. 6C, the second and fourth actuators 152b, 152d have been operated to lower the corresponding second and fourth shields 106b, 106d out of the optical path of the elongated laser beam 34. In other words, in the arrangement of FIG. 6C, a portion of the elongated laser beam 34 is blocked or otherwise affected by the first, third and fifth shields 106a, 106c, 106e, and other portions of the elongated laser beam 34 freely pass or not otherwise affected by the shielding assembly 102 at locations between the first and third shields 106a, 106c (i.e., a location of the second shield 106b were the second shield 106b to have been located in the optical path) and between the third and fifth shields 106c, 106e (i.e., a location of the fourth shield 106d were the fourth shield 106d to have been located in the optical path). In some embodiments, the shielding assembly 102 can be arranged such that one or more of the shields 106 effects a partial block of the elongated laser beam 34. For example, in the exemplary arrangement of FIG. 6D, the first and fifth shields 106a, 106e are arranged to encompass or block an entirety of the height HL of the elongated laser beam 34, the second and fourth shields 106b, 106d are arranged entirely outside of the elongated laser beam 34 (e.g., no blocking), and the third shield 106c is arranged to effect a partial block of the elongated laser beam 34 (e.g., the third shield 106c extends along a portion, but not an entirety, of the height HL).

Figure 7A:
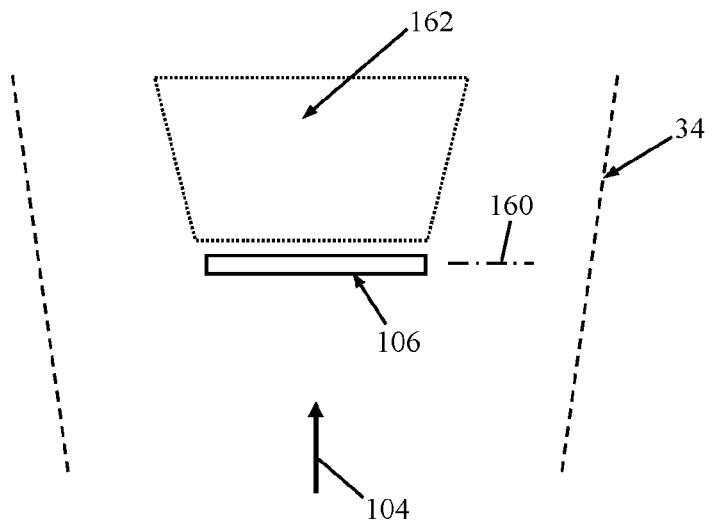
FIG. 7A is an enlarged, simplified top view of a portion of the shielding assembly of FIG. 6A, and depicting a shield in a first orientation relative to an elongated laser beam.
Figure 7B:
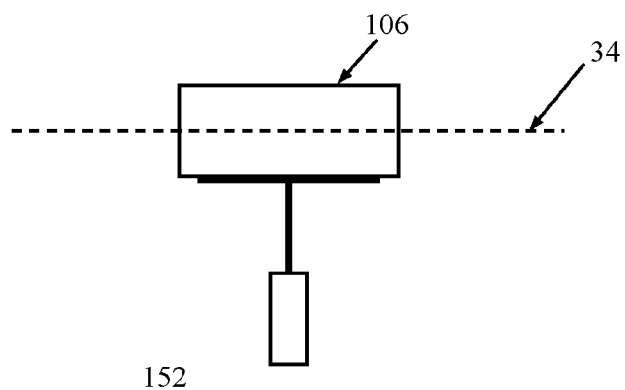
FIG. 7B is a simplified end view of the arrangement of FIG. 7A, and further depicting an actuator connected to the shield.
Figure 8A:
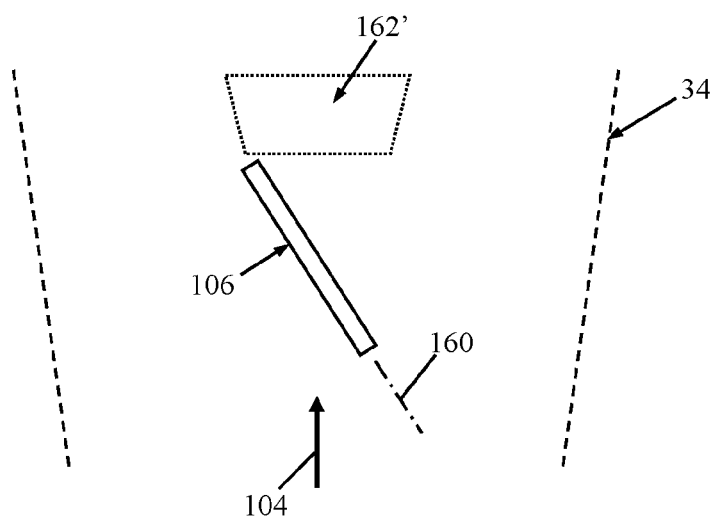
FIGS. 8A and 8B illustrate the portion of FIGS. 7A and 7B with the shield in a second orientation relative to the elongated laser beam.
Figure 8B:
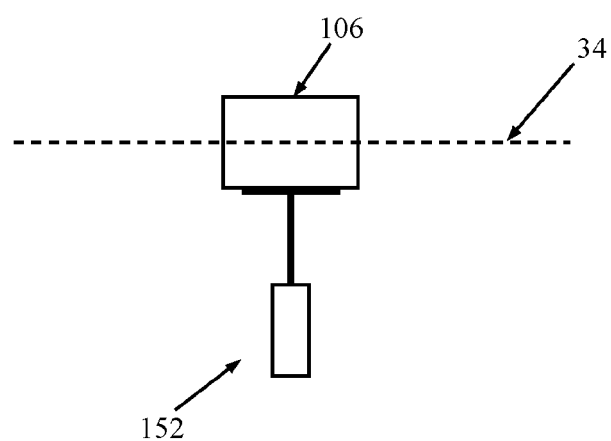

In some optional embodiments, one or more of the actuators 152 is further configured to selectively rotate the corresponding shield 106 (e.g., motor-driven rotation, pneumatic-driven rotation, etc.). By way of further explanation, FIGS. 7A and 7B illustrates a single one of the shields 106 and a corresponding one of the actuators 152 in isolation, along with portion of the elongated laser beam 34 and the propagation direction 104. A shape of the shield 106 defines a major plane 160. In the configuration of FIGS. 7A and 7B, the shield 106 is arranged such that the major plane 160 is substantially perpendicular (i.e., within 5 degrees of a truly perpendicular arrangement) to the propagation direction 104. With optional embodiments in which the actuator 152 is further configured to selectively rotate the shield 106, the shield 106 can be rotated to the arrangement of FIGS. 8A and 8B, for example. As shown, the shield 106 has been rotated or arranged such that the major plane 160 is not substantially perpendicular to the propagation direction 104 and instead is at a non-perpendicular and non-parallel orientation (relative to the propagation direction 104). A comparison of FIGS. 7A and 7B with FIGS. 8A and 8B reveals that rotating the shield 106 relative to the propagation direction 104 lessens the surface area or "size" of obstruction the shield 106 presents to the elongated laser beam 34. In particular, when the major plane 160 is arranged substantially perpendicular to the propagation direction 104 as in FIGS. 7A and 7B, a region of laser beam obstruction (generally represented at 162 in FIG. 7A) presented by the shield 106 to the elongated laser beam 34 is maximized. Rotating the shield 106 such that the major plane 160 is not substantially perpendicular to the propagation direction 104 as in FIGS. 8A and 8B, decreases a size of the region of laser beam obstruction (generally represented at 162' in FIG. 8A).

Returning to FIGS. 6A-6C, the controller 154 can be or include a computer or computer-like device (e.g., a programmable logic controller) that is electronically connected to each of the actuators 152. The controller 154 dictates operation of each of the actuators 152, and thus a position of each of the shields 106 relative to the optical path of the elongated laser beam 34 (i.e., in the optical path of the elongated laser beam 34, or out of the optical path). The controller 154 can be programmed or can operate on programming (e.g., software, hardware, etc.) with one or more algorithms that identify a desired arrangement of the shields 106 as described in greater detail below. In some optional embodiments, the controller 154 can be electronically programmed to control operation of other components, such as the laser source 120 as shown in FIG. 2.

Returning to FIG. 2, during use the control apparatus 32 emits the elongated laser beam 34 with a targeted intensity profile onto the glass ribbon 22, with the targeted intensity profile entailing one or more regions of relatively high laser energy or optical intensity, and one or more regions of no (or relatively low) laser energy or optical intensity, across the width WL of the elongated laser beam 34. The region(s) of relatively high laser energy or optical intensity effect an increase in temperature and corresponding decrease in viscosity at the glass ribbon 22 sufficient to result in a reduction in thickness T, whereas the regions of no (or relatively low) laser energy or optical intensity do not. Thus, although an entirety of the width W of the glass ribbon 22 can be within the width WL (FIG. 3A) of the elongated laser beam 34 in some embodiments, selected portions of the glass ribbon 22 across the width W will be subjected to the relatively high laser energy or optical intensity, whereas other portions of the glass ribbon 22 across the width W and within the width WL of the elongated laser beam 34 will not. The targeted intensity profile thus corresponds with the desired selected portions of the glass ribbon 22, and is imparted into the elongated laser beam 34 by the shielding assembly 102.

Figure 9A:
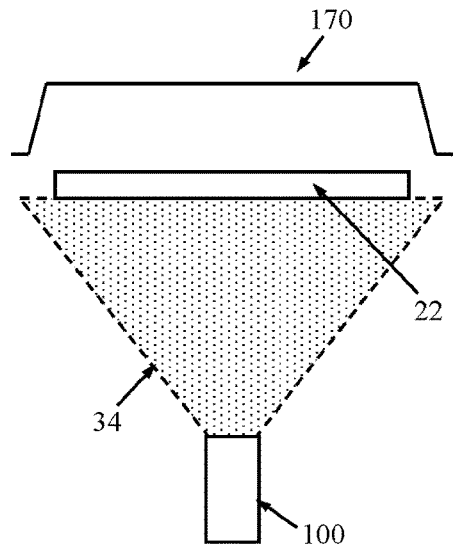
FIG. 9A is a schematic top view of a laser assembly emitting an elongated laser beam onto a glass ribbon.
Figure 9B:
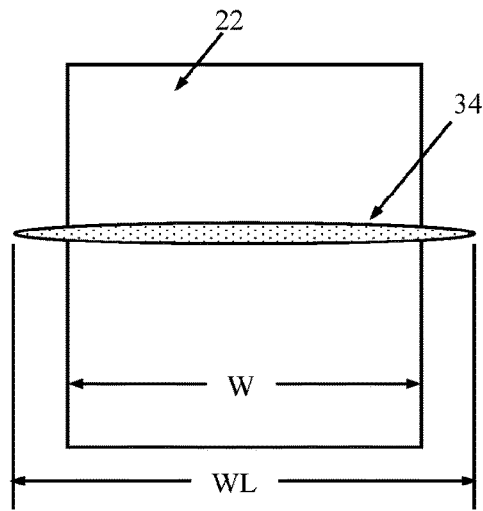
FIG. 9B is a schematic end view of the elongated laser beam impinging upon the glass ribbon with the arrangement of FIG. 9A.

Operation of the shielding assembly 102 in modifying the optical intensity profile of the elongated laser beam 34 (as initially generated by the laser assembly 100) to a targeted intensity profile is further explained with initial reference to FIG. 9A that otherwise represents the laser assembly 100 emitting the elongated laser beam 34 onto the glass ribbon 22. In the representation of FIG. 9A, the shields 106 (FIG. 6) described above are not in the optical path of the elongated laser beam 34. In other words, the intensity profile of the elongated laser beam 34 as generated by the laser assembly 100 is not altered or changed prior to impinging upon the glass ribbon 22. FIG. 9B is a simplified representation of the elongated laser beam 34 on the glass ribbon 22 under the scenario of FIG. 9A. Shading of the elongated laser beam 34 in FIG. 9B represents laser energy being applied onto the glass ribbon 22. Laser energy is applied to the glass ribbon 22 at all regions of the glass ribbon 22 within the shape of the elongated laser beam 34. Returning to FIG. 9A, a representation of an intensity profile 170 of the elongated laser beam 34 at the glass ribbon 22 is shown by a trace or plot line. The intensity profile 170 of the elongated laser beam 34 is consistent across the entire width WL of the elongated laser beam 34 and thus across the entire width W of the glass ribbon 22. In that there are no shields or barriers in the optical path, the intensity profile 170 shown in FIG. 9A is the initial intensity profile of the elongated laser beam 34 as generated by the laser assembly 100. The initial intensity profile 170 can have a wide flat plateau shape; and as represented in FIG. 9B, this initial intensity profile 170 applies laser energy across the entire width W of the glass ribbon 22 with no interruptions.

Figure 10A:
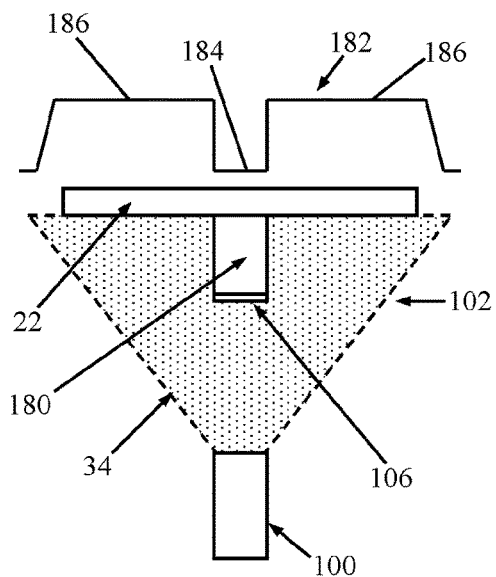
FIG. 10A is a schematic top view of a control apparatus of the present disclosure emitting an elongated laser beam onto a glass ribbon.
Figure 10B:
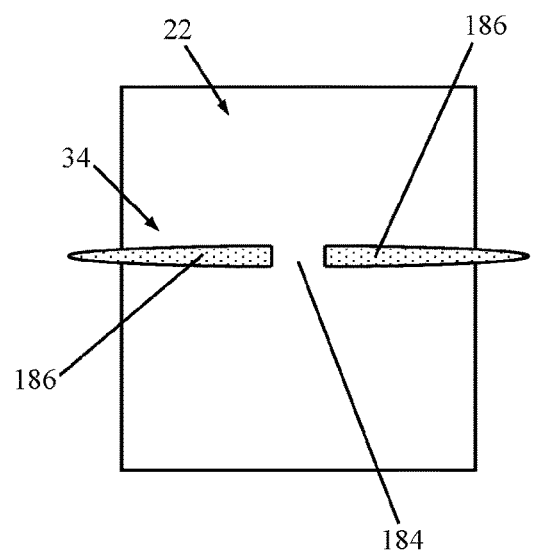
FIG. 10B is a schematic end view of the elongated laser beam impinging upon the glass ribbon with the arrangement of FIG. 10A.

In the illustration of FIG. 10A, one of the shields 106 is inserted into the elongated laser beam 34 via operation of the shielding assembly 102 (referenced generally). That is to say, the laser beam output of the laser assembly 100 and relationship relative to the glass ribbon 22 is identical in FIGS. 9A and 10A, but unlike the arrangement of FIG. 9A, the shield 106 is inserted into the optical path of the elongated laser beam 34 in FIG. 10A. By way of non-limiting example and with reference to the example shielding assembly 102 of FIGS. 6B and 6C, the shielding assembly 102 can be operated to position the third shield 106c in the optical path, and withdraw the first, second, fourth and fifth shields 106a, 106b, 106d, 106e from the optical path. Returning to FIG. 10A, the shield 106 obstructs a portion of the elongated laser beam 34 (schematically represented at 180 in FIG. 10A) as the elongated laser beam 34 travels in the propagation direction 104 (FIG. 2) and impinges upon the glass ribbon 22. The shield 106 decreases an optical intensity of a region of the elongated laser beam 34 such that at the glass ribbon 22, the elongated laser beam 34 has a targeted intensity profile 182. A region of reduced optical intensity is identified at 184. By way of further clarification, recall that the initial intensity profile 170 of FIG. 9A represents the intensity profile of the elongated laser beam 34 in FIG. 10A optically before or upstream of the shield 106; a comparison of the initial intensity profile 170 with the targeted intensity profile 182 illustrates an effect of the shield 106 in generating the region of reduced optical intensity 184. Further, FIG. 10B is a simplified representation of the elongated laser beam 34 on the glass ribbon 22 under the scenario of FIG. 10A. Shading of the elongated laser beam 34 in FIG. 10B represents laser energy being applied onto the glass ribbon 22; as shown, the region of reduced optical intensity 184 is an interruption in the optical intensity of the elongated laser beam 34 across the width W of the glass ribbon 22.

In some embodiments, the shield 106 completely blocks the elongated laser beam 34 at the obstructed portion 180. FIG. 10B illustrates that under these circumstances, no laser energy impinges upon the glass ribbon 22 at the region of reduced optical intensity 184. In other embodiments, some laser energy may pass through and/or around the shield 106, with some laser energy reaching the glass ribbon 22 at the region of reduced optical intensity 184. Regardless, the targeted intensity profile 182 at the glass ribbon 22 includes the region of reduced optical intensity 184 and one or more regions of elevated optical intensity (such as regions 186 identified in FIGS. 10A and 10B). The optical intensity of the elongated laser beam 34 is lesser at the region of reduced optical intensity 184 as compared to the region(s) of elevated optical intensity 186. Laser energy as applied to the glass ribbon 22 at the region(s) of elevated optical intensity 186 increases the temperature and decrease the viscosity of the glass ribbon 22 (in a viscous state) sufficient to reduce a thickness of portions of the glass ribbon 22 at the region(s) of elevated optical intensity 186. Conversely, laser energy, if any, applied to the glass ribbon 22 at the region of reduced optical intensity 184 is either not sufficient to increase the temperature of the glass ribbon 22 at the region of reduced optical intensity 184, or increases the temperature and decreases the viscosity of the glass ribbon 22 at the region of reduced optical intensity 184 to a lesser extent (as compared to the region(s) of elevated optical intensity 186) such that a reduction in thickness of the glass ribbon 22 at the region of reduced optical intensity 184, if any, is less than that at the region(s) of elevated optical intensity 186.

Figure 11A:
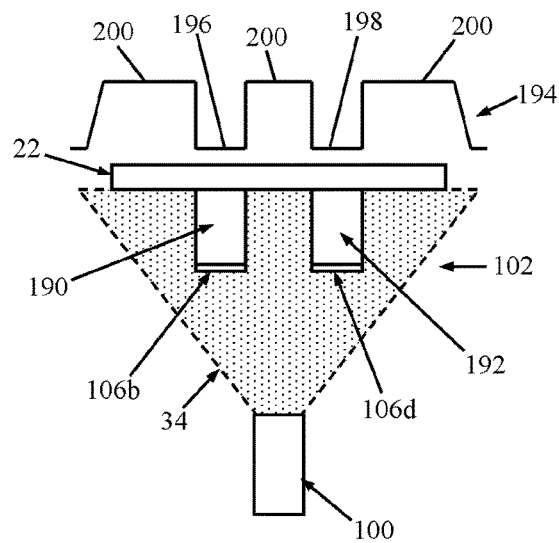
FIG. 11A is a schematic top view of a control apparatus of the present disclosure emitting an elongated laser beam onto a glass ribbon.
Figure 11B:
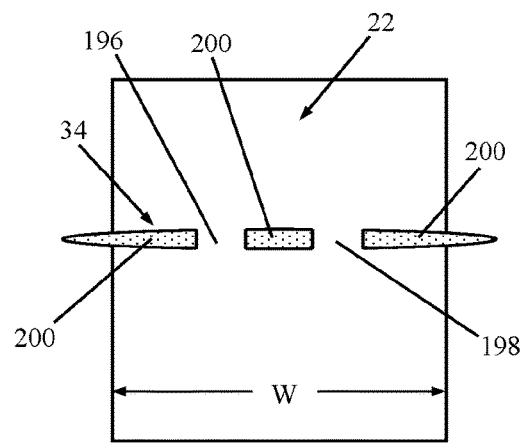
FIG. 11B is a schematic end view of the elongated laser beam impinging upon the glass ribbon with the arrangement of FIG. 11A.

FIG. 10A is one non-limiting example of an arrangement of the shielding assembly 102. FIG. 11A illustrates another possible arrangement in which the shielding assembly 102 (referenced generally) has been operated to insert two of the shields into the optical path of the elongated laser beam 34, identified as the shields 106b, 106d. That is to say, the laser beam output of the laser assembly 100 and relationship relative to the glass ribbon 22 is identical in FIGS. 9A and 11A, but unlike the arrangement of FIG. 9A, the shields 106b, 106d are inserted into the optical path of the elongated laser beam 34 in FIG. 11A. By way of non-limiting example and with reference to the example shielding assembly 102 of FIGS. 6B and 6C, the shielding assembly 102 can be operated to position the second and fourth shields 106b, 106d in the optical path, and withdraw the first, third, and fifth shields 106a, 106c, 106e from the optical path. Regardless, and returning to FIG. 11A, the shields 106b, 106d each obstruct a portion of the elongated laser beam 34 (schematically represented at 190 and 192, respectively, in FIG. 11A) as the elongated laser beam 34 travels in the propagation direction 104 (FIG. 2) and impinges upon the glass ribbon 22. The shields 106b, 106d each decrease an optical intensity of a region of the elongated laser beam 34 such that at the glass ribbon 22, the elongated laser beam 34 has a targeted intensity profile 194. Corresponding first and second regions of reduced optical intensity are identified at 196 and 198, respectively. By way of further clarification, recall that the initial intensity profile 170 of FIG. 9A represents the intensity profile of the elongated laser beam 34 in FIG. 11A optically before or upstream of the shields 106*b*, 106*d*; a comparison of the initial intensity profile 170 with the targeted intensity profile 194 illustrates an effect of the shields 106*b*, 106*d* in generating the regions of reduced optical intensity 196, 198. Further, FIG. 11B is a simplified representation of the elongated laser beam 34 on the glass ribbon 22 under the scenario of FIG. 11A. Shading of the elongated laser beam 34 in FIG. 11B represents laser energy being applied onto the glass ribbon 22; as shown, the regions of reduced optical intensity 196, 198 are each an interruption in the optical intensity of the elongated laser beam 34 across the width W of the glass ribbon 22.

The targeted intensity profile 194 at the glass ribbon 22 includes the regions of reduced optical intensity 196, 198 and one or more regions of elevated optical intensity (such as regions 200 identified in FIGS. 11A and 11B). The optical intensity of the elongated laser beam 34 is lesser at the regions of reduced optical intensity 196, 198 as compared to the region(s) of elevated optical intensity 200. Laser energy as applied to the glass ribbon 22 at the region(s) of elevated optical intensity 200 increases the temperature and decreases the viscosity of the glass ribbon 22 (in a viscous state) sufficient to reduce a thickness of portions of the glass ribbon 22 at the region(s) of elevated optical intensity 200. Conversely, laser energy, if any, applied to the glass ribbon 22 at the regions of reduced optical intensity 196, 198 is either not sufficient to increase the temperature of the glass ribbon 22, or increases the temperature and decreases the viscosity of the glass ribbon 22 to a lesser extent (as compared to the region(s) of elevated optical intensity 200) such that a reduction in thickness of the glass ribbon 22 at the regions of reduced optical intensity 196, 198, if any, is less than that at the region(s) of elevated optical intensity 200.

Figure 12A:
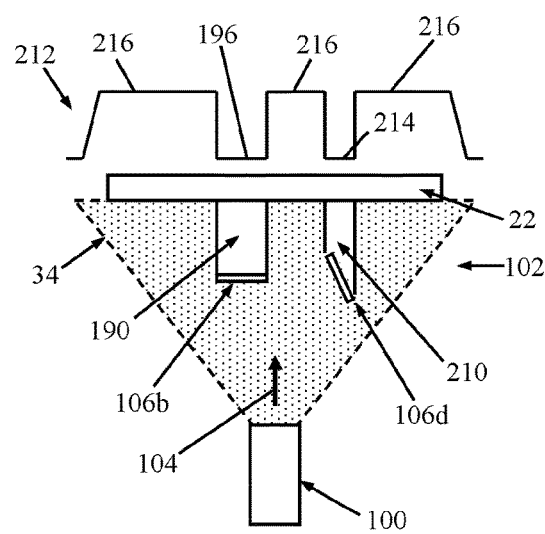
FIG. 12A is a schematic top view of a control apparatus of the present disclosure emitting an elongated laser beam onto a glass ribbon.
Figure 12B:
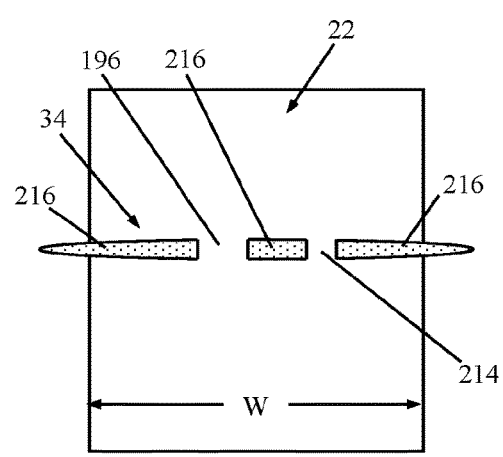
FIG. 12B is a schematic end view of the elongated laser beam impinging upon the glass ribbon with the arrangement of FIG. 12A.

As previously described with respect to FIGS. 7A-8B, in some embodiments the shielding assembly 102 can be configured to facilitate rotation of one or more of the shields 106 relative to the propagation direction 104. With this in mind, FIG. 12A illustrates another possible arrangement of the shielding assembly 102 highly akin to that of FIG. 11A (i.e., the second and fourth shields 106*b*, 106*d* have been interested into the optical path of the elongated laser beam 34), except that the fourth shield 106*d* has been rotated relative to the propagation direction 104. Once again, the shields 106*b*, 106*d* each obstruct a portion of the elongated laser beam 34 (schematically represented at 190 and 210, respectively, in FIG. 12A) as the elongated laser beam 34 travels in the propagation direction 104 and impinges upon the glass ribbon 22. The shields 106*b*, 106*d* each decrease an optical intensity of a region of the elongated laser beam 34 such that at the glass ribbon 22, the elongated laser beam 34 has a targeted intensity profile 212. Corresponding first and second regions of reduced optical intensity are identified at 196 and 214, respectively. A comparison of FIGS. 11A and 12A reveals that by rotating the fourth shield 106*d*, a size (relative to the width W of the glass ribbon 22) of the corresponding region of reduced optical intensity 214 is lessened (as compared to the region of reduced optical intensity 198 in FIG. 11A). Further, FIG. 12B is a simplified representation of the elongated laser beam 34 on the glass ribbon 22 under the scenario of FIG. 12A. Shading of the elongated laser beam 34 in FIG. 12B represents laser energy being applied onto the glass ribbon 22; as shown, the regions of reduced optical intensity 196, 214 are each an interruption in the optical intensity of the elongated laser beam 34 across the width W of the glass ribbon 22, with a size of the region of reduced optical intensity 214 generated by the fourth shield 106*d* being less than that of the region of reduced optical intensity 196 generated by the second shield 106*b*.

The targeted intensity profile 212 at the glass ribbon 22 includes the regions of reduced optical intensity 196, 214 and one or more regions of elevated optical intensity (such as regions 216 identified in FIGS. 12A and 12B). The optical intensity of the elongated laser beam 34 is lesser at the regions of reduced optical intensity 196, 214 as compared to the region(s) of elevated optical intensity 216. Laser energy as applied to the glass ribbon 22 at the region(s) of elevated optical intensity 216 increases the temperature and decrease the viscosity of the glass ribbon 22 (in a viscous state) sufficient to reduce a thickness of the glass ribbon 22 at the region(s) of elevated optical intensity 216. Conversely, laser energy, if any, applied to the glass ribbon 22 at the regions of reduced optical intensity 196, 214 is either not sufficient to increase the temperature of the glass ribbon 22, or increases the temperature and decreases the viscosity of the glass ribbon 22 to a lesser extent (as compared to the region(s) of elevated optical intensity 216) such that a reduction in thickness of the glass ribbon 22 at the regions of reduced optical intensity 196, 214, if any, is less than that at the region(s) of elevated optical intensity 216.

Figure 13:
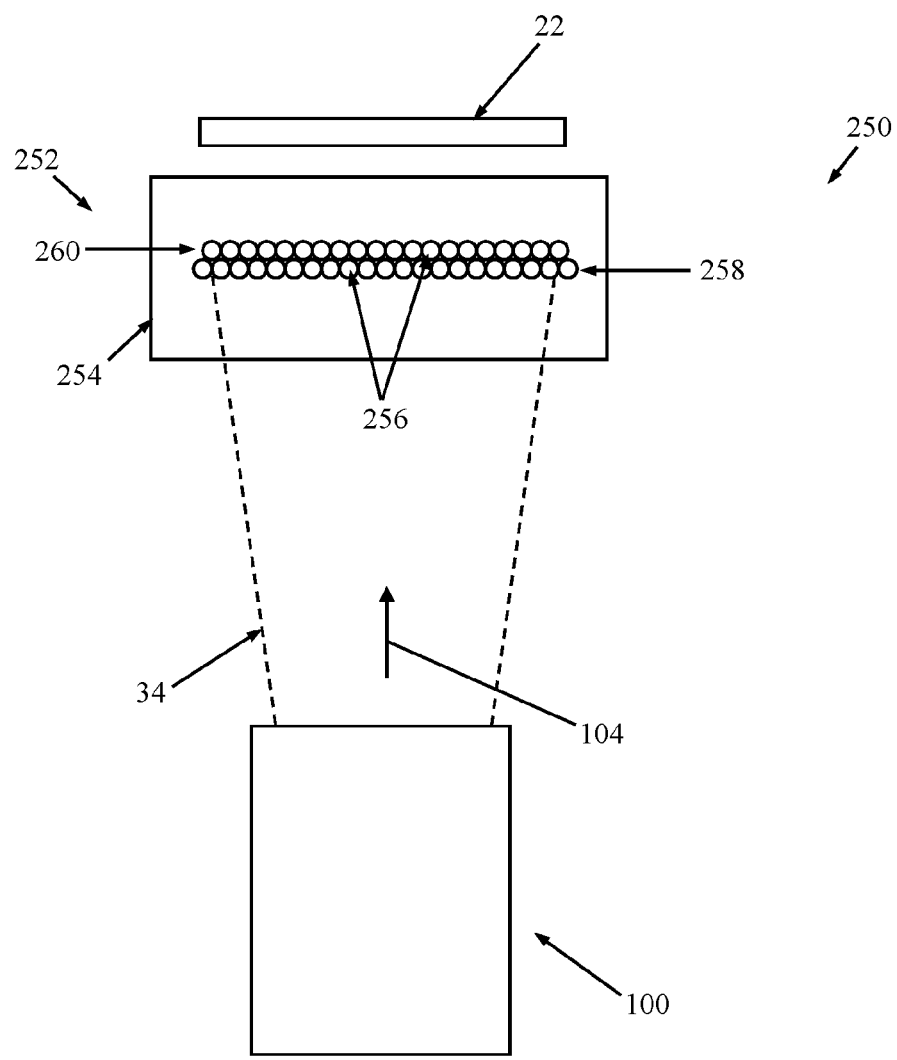
FIG. 13 is a schematic top view of a control apparatus of the present disclosure emitting an elongated laser beam relative to a glass ribbon, the control apparatus including a shielding assembly.

While the shields 106 have been generally illustrated as being plate-like, other constructions are also acceptable. For example, portions of another control apparatus 250 in accordance with principles of the present disclosure are shown in FIG. 13, along with the glass ribbon 22. The control apparatus 250 includes the laser assembly 100 as described above, along with a shielding assembly 252. Commensurate with the descriptions above, the laser assembly 100 operates to emit the elongated laser beam 34, and the shielding assembly 252 operates to decrease an optical intensity of regions of the elongated laser beam 34. As a result, the elongated laser beam 34 has a targeted intensity profile at the point of impingement with the glass ribbon 22.

Figure 14A:
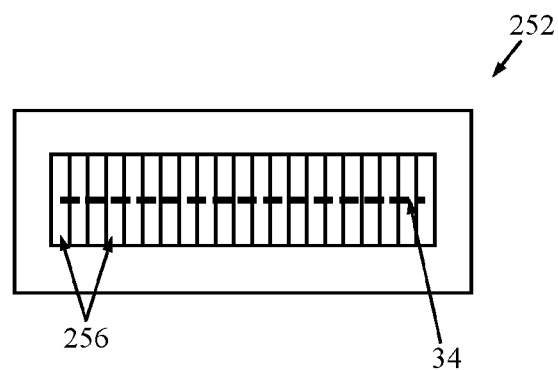
FIG. 14A is a simplified end view of the shielding assembly of FIG. 13 relative to the elongated laser beam and in a first configuration.

The shielding assembly 252 includes a housing (or shroud) 254 and a plurality of pins 256. The housing 254 can take any of the forms described in the present disclosure, and is generally configured for installation relative to the laser assembly 100 and the glass ribbon 22 in a manner that locates the pins 256 in an optical path of the elongated laser beam 34. The pins 256 are each formed of a material that absorbs, blocks, or scatters laser beam energy as described above. The pins 256 can be arranged within the housing 254 in a grid or array-like format, for example as first and second rows 258, 260, all though any other number of rows (greater or lesser than two) is also acceptable. Also, the number of pins 256 provided in each of the rows 258, 260 can be greater or lesser than otherwise reflected by the simplified representation of FIG. 13 (e.g., as a function of a size or diameter of each of the pins 256). Regardless, the pins 256 can be selectively manipulated relative to the optical path of the elongated laser beam 34. For example, the shielding assembly 252 can include a shelf (not shown) or similar structure that supports each of the pins 256 in a manner permitting manual insertion/removal of individual ones of the pins 256 into/out of the housing 254. Alternatively or in addition, the shielding assembly 252 can include one or more mechanisms (not shown) that facilitate automated movement of the pins 256 relative to housing 254 so as to selectively locate individual ones of the pins 256 either in or out of the optical path. By way of further explanation, each of the pins 256 visible in the view of FIG. 14A are located in the optical path of the elongated laser beam 34. With additional reference to FIG. 13, it will be understood that FIG. 14A shows the pins 256 of the first row 258; the pins 256 of the second row 260 are hidden in FIG. 14A. By optionally including two (or more) rows of the pins 256, the ability to more completely block laser beam energy at desired regions of the elongated laser beam 34 can be enhanced. For example, laser beam energy that undesirably "leaks" between two immediately adjacent ones of the pins 256 of the first row 258 can be blocked, absorbed or scattered by the pins 256 of the second row 260 otherwise located immediately behind the pins 256 of the first row 258. The two or more rows of the pins 256 can provide other laser beam intensity control options as described below.

Figure 14B:
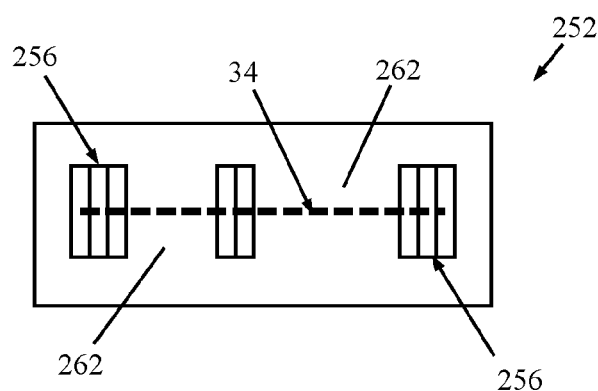
FIG. 14B is a simplified end view of the shielding assembly of FIG. 14A in a second configuration.

During use, the pins 256 of the shielding assembly 252 can be configured to effectuate the desired targeted intensity profile. FIG. 14B provides one possible arrangement of the shielding assembly 252 in which several of the pins 256 have been removed (from both of the first and second rows 258, 260 (FIG. 13), resulting in open segments 262. The elongated laser beam 34 is blocked (or dissipated) by the pins 256 except at the open sections 262. A resultant targeted intensity profile of the elongated laser beam 34 exiting the shielding assembly 252 will have regions of elevated optical intensity corresponding with the open sections 262, and regions of reduced optical intensity (e.g., zero optical intensity) at regions corresponding with the pins 256. The arrangement of the pins 256 can thus be selected to create a desired targeted intensity profile.

Figure 15:
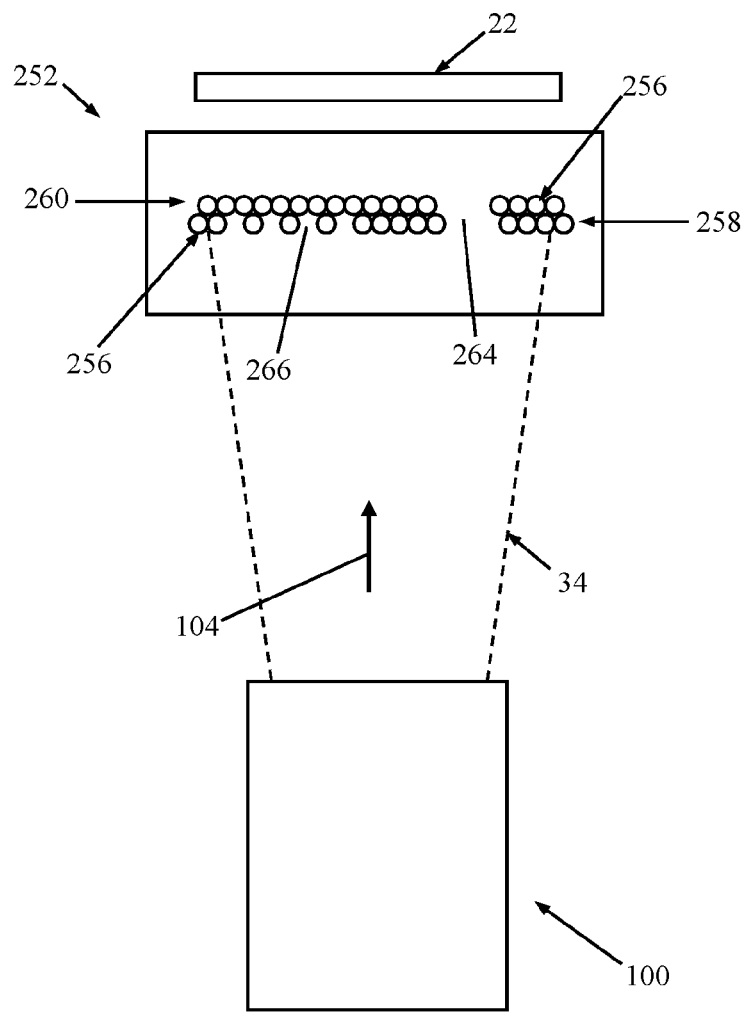
FIG. 15 is a schematic top view of the control apparatus of FIG. 13, including the shielding assembly in a third configuration.

Another possible arrangement of the pins 256 is shown in FIG. 15. The pins 256 of the first and second rows 258, 260 have been removed at an open section 264, and every other one of the pins 256 of the first row 258 has been removed at a partially open section 266 (e.g., the pins 256 of the second row 260 are present or not removed at the partially open section 266). With this and similar constructions, an optical intensity of the elongated laser beam 34 is not affected or reduced by the shielding assembly 252 at the open section 264, is partially reduced (but not completely blocked) at the partially open section 266, and is substantially completely blocked at all other segments (i.e., blocked to a greater extent than at the partially open section 266). A resultant targeted intensity profile of the elongated laser beam 34 exiting the shielding assembly 252 will have a region of elevated optical intensity corresponding with the open section 264, a region of intermediate optical intensity corresponding to the partially open section 266, and regions of reduced optical intensity (e.g., zero optical intensity) at all other location. An optical intensity of the region of optical intensity will be less than that of the region of elevated optical intensity and greater than that of the regions of reduced optical intensity. Thus, by removing some, but not all, of the pins 256 from the shielding assembly 252 in a direction perpendicular to the propagation direction 104, an intensity of the elongated laser beam 34 can be reduced, but not eliminated entirely, in a desired manner.

Figure 16A:
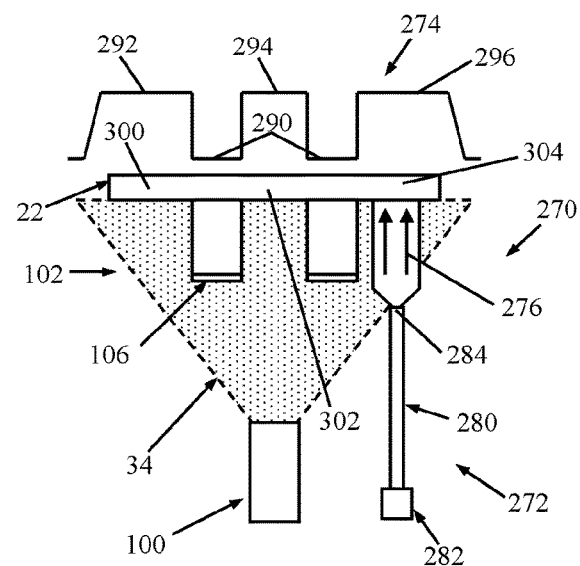
FIG. 16A is a schematic top view of a control apparatus of the present disclosure emitting an elongated laser beam onto a glass ribbon.

Returning to FIG. 1, the control apparatus 32 of the present disclosure can optionally include one or more additional features that further facilitate controlled thickness modifications across a width of a substrate, such as the glass ribbon 22. For example, portions of another control apparatus 270 in accordance with principles of the present disclosure are shown in simplified form in FIG. 16A, along with the glass ribbon 22. The control apparatus 270 is akin to the control apparatus 32 (FIG. 2), and includes the laser assembly 100 and the shielding assembly 102 (referenced generally) as described above, along with a cooling assembly 272. Commensurate with the above descriptions, the laser assembly 100 operates to emit the elongated laser beam 34, and the shielding assembly 102 operates to decrease an optical intensity of regions of the elongated laser beam 34 (such as by inserting one or more of the shields 106 into the optical path). As a result, the elongated laser beam 34 has a targeted intensity profile (represented by the trace or plot line 274) at the point of impingement with the glass ribbon 22. The cooling assembly 272 operates to direct a flow of cooling medium 276 onto one or more selected portions of the glass ribbon 22, alternatively in a direction of the glass ribbon 22 but not actually impinging upon the glass ribbon 22, thus extracting heat from the glass ribbon 22 at the selected portions as described below. As a point of clarification, the flow of cooling medium 276 is schematically represented in FIG. 16A and does not necessarily implicate that the elongated laser beam 34 is being disrupted or altered by the flow of cooling medium 276.

The cooling assembly 272 can assume various forms appropriate for directing a cooling medium onto the glass ribbon 22. For example, the cooling assembly 272 can include a delivery tube 280 and a flow controller 282. The delivery tube 280 is generally configured for directing the flow of cooling medium 276 (gas such as air, liquid, etc.) in a focused pattern from a dispensing end 284. For example, the delivery tube 280 can be a small diameter tube that may or may not carry a nozzle at the dispensing end 284. The flow controller 282 is in fluid communication with a source (not shown) of the cooling medium (e.g., a pressurized source of air), and regulates the delivery of cooling medium from the source to the delivery tube 280. In some embodiments, the cooling assembly 272 can further include one or more mechanisms or supports (not shown) that are operable for selectively positioning the dispensing end 284 relative to the glass ribbon 22 (e.g., increasing or decreasing a distance between the dispensing end 284 and the glass ribbon 22, shifting the dispensing end 284 relative to the width W of the glass ribbon 22, etc.). While the cooling assembly 272 is illustrated as consisting of the single delivery tube 280, in other embodiments, two or more of the delivery tubes 280 can be provided. With these and related embodiments, a separate flow controller 282 can be provided for each individual delivery tube 280; alternatively, two or more of the delivery tubes 280 can be connected to a single one of the flow controllers 282. In yet other embodiments, the cooling assembly 272 can be arranged at an opposite side of the glass ribbon 22 (opposite the laser assembly 100); in related embodiments, one or more cooling assemblies 272 can be arranged at both sides of the glass ribbon 22.

Figure 16B:
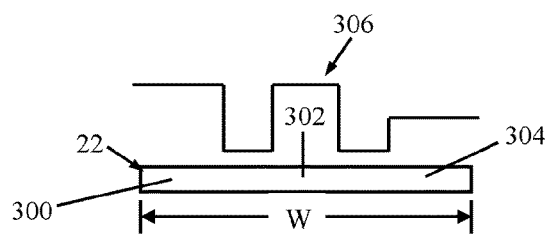
FIG. 16B depicts a temperature change profile experience by the glass ribbon with the arrangement of FIG. 16A.

During use, the elongated laser beam 34 is directed onto the glass ribbon 22 with the targeted intensity profile 274. While a multitude of different targeted intensity profiles can be effectuated by the shielding assembly 102, in the example of FIG. 16A, the targeted intensity profile 274 includes regions of reduced optical intensity 290, and first, second and third regions of elevated optical intensity 292, 294, 296. The first, second and third regions of elevated optical intensity impinge upon the glass ribbon 22 at first, second and third portions 300, 302, 304, respectively. The cooling assembly 272 simultaneously operates to direct the flow of cooling medium 276 onto the glass ribbon 22 at the third portion 304 (i.e., a location corresponding with the third region of elevated optical intensity 296). While the elongated laser beam 34 acts to raise a temperature of the third portion 304 of the glass ribbon 22 via the third region of elevated optical intensity 296, the flow of cooling medium 276 simultaneously cools the third portion 304. As a result, the increase in temperature (if any) experienced by the glass ribbon 22 at the third portion 304 is lesser as compared to the first and second portions 300, 302 (at which the first and second regions of elevated optical intensity 292, 294, respectively, impinge upon the glass ribbon 22), such that the decrease in viscosity (if any) and corresponding reduction in thickness (if any) of the glass ribbon 22 at the third portion 304 is also lesser as compared to the first and second portions 300, 302. A trace or plot line 306 in FIG. 16B illustrates the increase in temperature across the width W of the glass ribbon 22 under the arrangement of FIG. 16A. As shown, the net increase in temperature at the third portion 304 is less than that at the first and second portions 300, 302 due to the flow of cooling medium 276. With these and similar embodiments, the cooling assembly 272 can operate to "fine-tune" the temperature profile at the glass ribbon 22 without reconfiguring the shielding assembly 102.

Figure 17A:
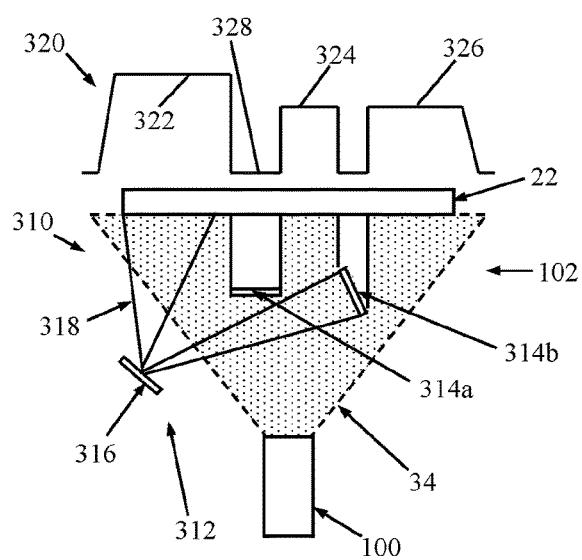
FIG. 17A is a schematic top view of a control apparatus of the present disclosure emitting an elongated laser beam onto a glass ribbon.

Portions of another control apparatus 310 in accordance with principles of the present disclosure are shown in simplified form in FIG. 17A, along with the glass ribbon 22. The control apparatus 310 is akin to the control apparatus 32 (FIG. 2), and includes the laser assembly 100 and the shielding assembly 102 (referenced generally) as described above, along with an intensity assembly 312 (referenced generally). Commensurate with the above descriptions, the laser assembly 100 operates to emit the elongated laser beam 34, and the shielding assembly 102 operates to decrease an optical intensity of regions of the elongated laser beam 34 by inserting one or more shields into the optical path, such as the first and second shields 314a, 314b identified in FIG. 17A. With the non-limiting embodiment of FIG. 17A, the shielding assembly 102 has been configured or arranged akin to that described above with respect to FIGS. 12A and 12B. Further, at least the second shield 314b presents a surface (e.g., a mirror) that reflects laser beam energy.

The intensity assembly 312 includes a reflection body 316. At least a surface of the reflection body 316 is formed of a material that reflects laser beam energy (e.g., a mirror). While the reflection body 316 is illustrated as being generally planar, other shapes or laser beam-affecting properties can be employed. The intensity assembly 312 can further include one or more mechanisms or supports (not shown) that are operable for selectively positioning the reflection body 316 relative to the shielding assembly 102 (e.g. toward or away from the shields, such as the second shield 314b, rotating, etc.). Regardless, the intensity assembly 312 is configured to arrange the reflection body 316 so as to reflect laser beam energy directed thereon by one or more of the shields, such as the second shield 314b in the arrangement of FIG. 17A, and direct the so-reflected laser beam energy at a desired portion of the glass ribbon 22 as generally indicated by lines 318 in FIG. 17A.

Figure 17B:
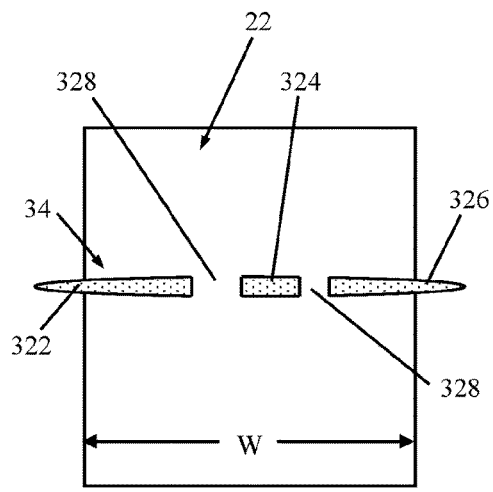
FIG. 17B is a schematic end view of the elongated laser beam impinging upon the glass ribbon with the arrangement of FIG. 17A.

With the above construction, the control apparatus 310 operates to deliver laser energy onto the glass ribbon 22 with a targeted intensity profile, and example of which is shown by a trace or plot line 320 in FIG. 17A. With the non-limiting arrangement of FIG. 17A (including a configuration of the shielding assembly 102 and the intensity assembly 312), the targeted intensity profile 320 includes first, second and third regions of elevated optical intensity 322, 324, 326, respectively, and regions of reduced optical intensity 328 (one of which is labeled in FIG. 17A). As a point of reference, the targeted intensity profile 320 represents a combination of the elongated laser beam 34 (as modified by the shielding assembly 102) and the reflected laser energy 318. Absent the intensity assembly 312, the targeted intensity profile would instead be akin to the targeted intensity profile 212 shown in FIG. 12A. The reflected laser energy 318 serves to increase the intensity of the first region of elevated optical intensity 322 (as compared to the second and third regions of elevated optical intensity 324, 326). As a result, the glass ribbon 22 experiences a greater increase in temperature and decrease in viscosity at the portion corresponding with the first region of elevated optical intensity 322 as compared to the portions of the glass ribbon 22 at which the second and third regions of elevated optical intensity 324, 326 impinge. FIG. 17B is a simplified representation of the laser energy on the glass ribbon 22 under the scenario of FIG. 17A. Shading in FIG. 17B represents the elongated laser beam 34 applied onto the glass ribbon 22; as shown, the regions of reduced optical intensity 328 are each an interruption in the optical intensity of the laser energy across the width W of the glass ribbon 22.

Figure 18:
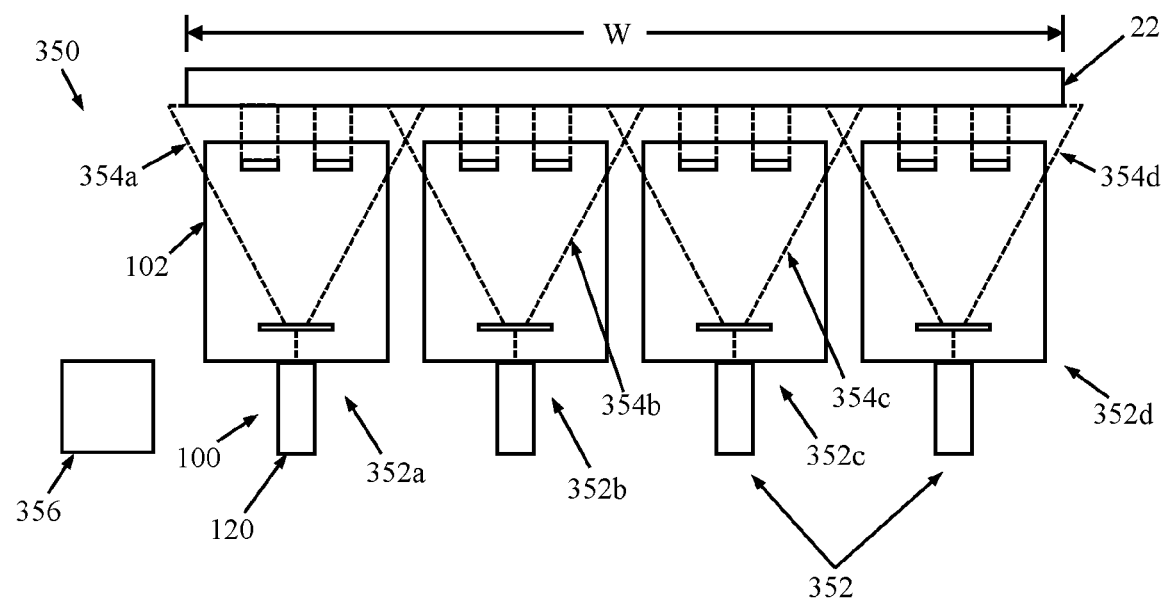
FIG. 18 is a schematic top view of a control apparatus of the presenting disclosure emitting elongated laser beams onto a glass ribbon.

Returning to FIG. 2, in some embodiments the control apparatuses of the present disclosure can include a single laser assembly and a single shielding assembly (along with other optional features described above), such as the laser assembly 100 and the shielding assembly 102 as illustrated for the control apparatus 32. In other embodiments, two or more of the laser assemblies 100 and a corresponding number of the shielding assemblies can be included. For example, FIG. 18 illustrates another embodiment control apparatus 350 that includes a plurality of control units 352, such as first, second, third and fourth control units 352a, 352b, 352c, 352d. While four of the control units 352 are shown, any other number, either greater or lesser, is also acceptable. In some embodiments, each of the control units 352 can have a similar construction akin to one or more of the control apparatuses described in the pending disclosure, for example each including the laser assembly 100 and the shielding assembly 102 as described above (labeled for the first control unit 352a). Each of the control units 352 operates to emit an elongated laser beam, for example elongated laser beams 354a, 354b, 354c, 354d identified in FIG. 18. The control units 352 are arranged such that the elongated laser beams 354a, 354b, 354c, 354d each impinge upon a section of the glass ribbon 22, and collectively encompass an entirety (or near entirety) of the width W of the glass ribbon 22. Operation of each of the control units 352 (e.g., an arrangement of each of the shields or other laser blocking body associated with the corresponding shielding assembly 102) can be controlled by a controller 356; in other embodiments, each of the control units 352 can include a dedicated controller. Regardless, with the optional construction of FIG. 18, the control units 352 can be installed in relatively close proximity to the glass ribbon 22, and the laser source 120 associate with each of the laser assemblies 100 can operate at a relatively low power setting (as compared to other embodiment control apparatuses employing an elongated laser beam from a single laser source to encompass the entire width W of the glass ribbon 22).

Returning to FIG. 1, the control apparatus 32 has been shown and described as directing the elongated laser beam 34 onto one side or face of the glass ribbon 22 (i.e., the side labeled at 360 in FIG. 1). In other embodiments of the present disclosure, one or more additional control apparatuses can be provided that emit an elongated laser beam onto an opposite side (i.e., opposite of the side 360). The control apparatuses of these alternative constructions can assume any of the forms described in the pending application, and may or may not be identical. Further, operation of the two or more control apparatuses can be dictated by a common controller, or can each have a dedicated controller.

Figure 19:
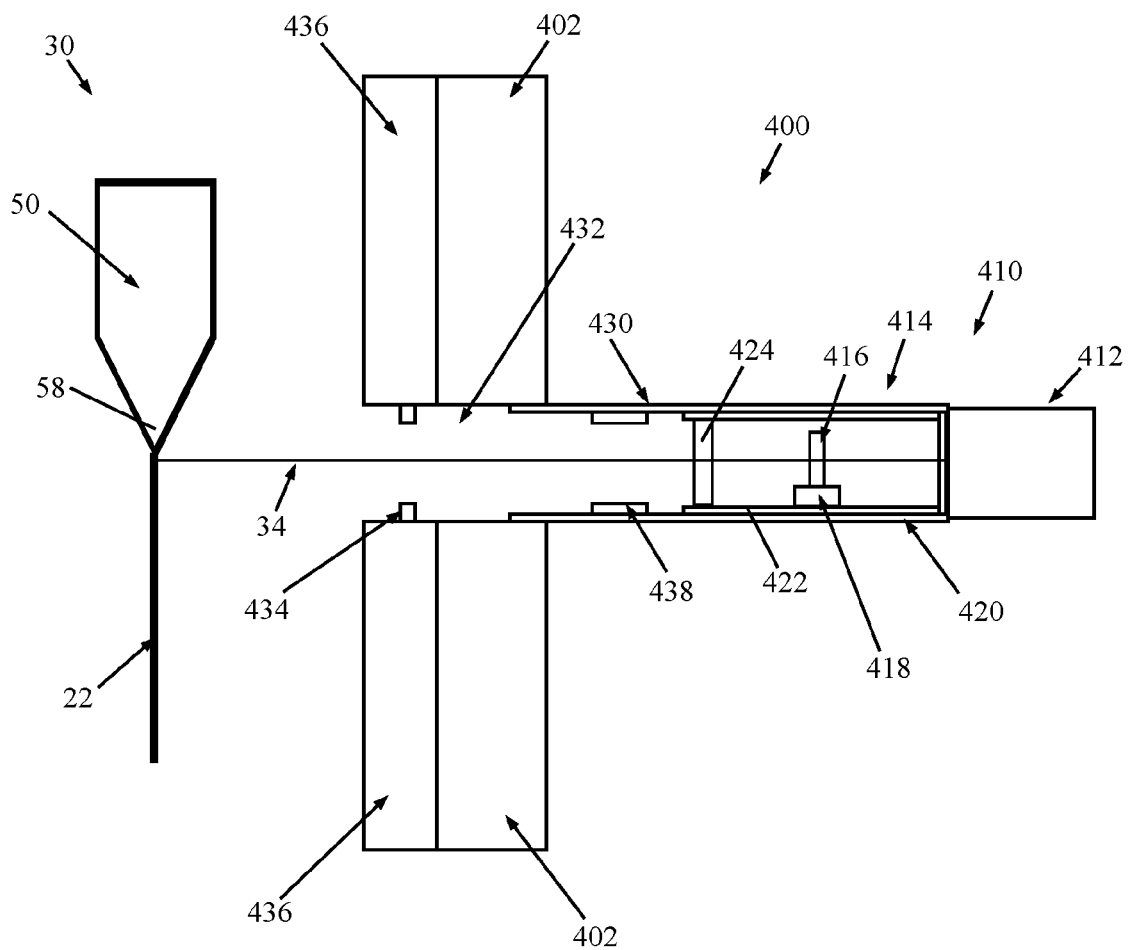
FIG. 19 is a schematic side view of a control system of the present disclosure installed to a glass forming apparatus.

The control apparatuses of the present disclosure can be installed relative to the substrate of interest in various fashions. With non-limiting embodiments in which the control apparatus is employed to control the thickness of a glass ribbon, additional optional components can be provided. For example, FIG. 19 illustrates one exemplary installation of a control system 400 in accordance principles of the present disclosure relative to the glass forming apparatus 30 described above with respect to FIG. 1. Once again, the glass forming apparatus 30 can include the forming body 50 terminating at the root 58 and from which the glass ribbon 22 is drawn in the direction 62. In some constructions, the glass forming apparatus 30 further includes an insulated housing or muffle 402, and the control system 400 can be installed to the insulated housing 402 as described below.

The control system 400 can include a control apparatus 410 that can assume any of the forms described in the present disclosure. For example, the control apparatus 410 includes a laser assembly 412 and a shielding assembly 414. The laser assembly 412 includes a laser source and optional optics adapted to generate the elongated laser beam 34 as described above. The shielding assembly 414 includes two or more laser beam shielding bodies (e.g., plates, pins, etc.), one of which is schematically shown at 416. As described above, the each of the shielding bodies 416 is selectively located in or out of an optical path of the elongated laser beam 34, for example by a corresponding actuator 418 as described above. Further, the shielding assembly 414 can include a housing or shroud 420 within which the shielding bodies 416 and the actuators 418 are maintained. Components associated with the laser assembly 412 (e.g., optics that transform a circular laser beam into an elongated laser beam, etc.) are also optionally located within the shroud 420.

The control system 400 can include components for mounting the control apparatus 410 to the existing insulated housing 402 at a location proximate the forming body 50 such that the elongated laser beam 34 impinges upon the glass ribbon 22 near the root 58. As a point of reference, while FIG. 19 illustrates the control apparatus 410 arranged such that the elongated laser beam 34 impinges upon the glass ribbon 22 slightly downstream of the root 58, other installation arrangement are also acceptable, including the elongated laser beam 34 impinging upon the glass ribbon 22 (or a flow of the molten glass combining into the glass ribbon 22) slightly upstream of the root 58. It will be understood that under normal glass forming conditions, temperatures at this optional installation location can be extremely high when producing molten glass. The control system 400 can include features that protect the laser assembly 412 and other components (e.g., the actuators 418) in this high heat environment. For example, the shroud 420 can have an air tight construction, and includes a jacket 422 and a window 424. The jacket 422 can be formed of a material exhibiting low thermal transfers, and optionally forms internal passages connected to a flow of a cooling fluid (e.g., the jacket 422 can be a water cooled jacket). At least the laser source of the laser assembly 412 can be mounted in series on the shroud 420 as shown. The window 424 is formed of a material that maintains the air tight construction of the shroud 420 and that is optically transparent to laser beam energy. In some non-limiting embodiments for example, the window 424 can be a zinc selenide (ZnSe) material.

In addition or alternatively, the control system 400 can further include a bracket 430 that connects or mounts the shroud 420 to the insulated housing 402 of the glass forming apparatus 30. As a point of reference, the bracket 430 can be installed to a pre-existing opening 432 in the insulated housing 402; alternatively, the opening 432 can be formed as part of the installation process. Regardless, the bracket 430 can be formed of a material differing from that of the jacket 422 (e.g., differing thermal transfer properties). Because the bracket 430 is interposed between the shroud 420 and the insulated housing 402 (i.e., the shroud 420 does not directly contact the insulated housing 402), thermal conduction from the insulated housing 402 to the shroud 420 is limited. Conversely, to offset a possible heat sink effect (i.e., undesired loss of heat from the glass forming apparatus 30 due to the presence of the opening 432 and the control system 400), the control system 400 can optionally include one or more active heater components 434. The active heater component(s) 434 can assume various forms known in the art, for example a metallic heating element (such as iron-chromium-aluminum (FeCrAl) alloys, nickel-chromium (NiCr) alloys, etc.), an infrared emitter (such as a halogen infrared emitter), etc. As a point of reference, FIG. 19 illustrates that the glass forming apparatus 30 can include heaters 436 pre-assembled to the insulated housing 402. The active heater components 434 of the control system 400 can be in addition to, and mounted to, the existing heaters 436. Alternatively, the glass forming apparatus 30 may not have pre-existing heaters 436. Regardless, the optional active heater component(s) 434 are mounted in the opening 432 and operated to mitigate the possible heat sink effect.

To mitigate condensation on the window 424, the control system 400 can include one or more moisture control devices 438, such as a replaceable silica gel cartridge or a replaceable water cooling cartridge. The moisture control device(s) 438 can be mounted to the bracket 430 in relatively close proximity to the window 424. Further, the control system 400 can provide for purging of air in a region of the window 424 and moisture control device(s) 438, such as by air flow passages through the bracket 430.

The control system 400 is but one non-limiting example of the installation of the control apparatuses of the present disclosure relative to a substrate, such as the glass ribbon 22. A plethora of other installation configurations are equally acceptable, and may or may not include one or more of the components described above with respect to the control system 400.

Returning to FIG. 2 and based on the foregoing descriptions, it will be understood that, according to some aspects, a method is provided of controlling a thickness of at least one preselected portion of a substrate, such as the glass ribbon 22. The method can comprise generating an elongated laser beam, effecting a targeted intensity profile into the elongated laser beam, and directed the elongated laser beam with the targeted intensity profile onto the substrate in a viscous state, wherein the thickness of the substrate at a location of the elongated laser beam is not fixed. At least one region of the targeted intensity profile possesses adequate energy to increase a temperature and reduce a viscosity of the at least one preselected portion of the substrate in the viscous state sufficiently to alter the thickness of the at least one preselected portion of the substrate. Consequently, at least one preselected portion of the substrate can be caused to attain a desired thickness. In some embodiments, two or more regions of the targeted intensity profile possess adequate energy to increase a temperature and reduce a viscosity of the substrate such that the elongated laser beam simultaneously alters the thickness of two or more preselected portions of the substrate.

Figure 20:
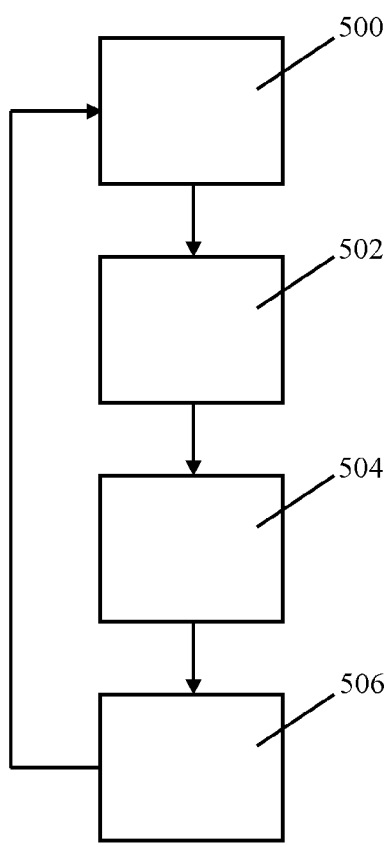
FIG. 20 is a flow diagram of a method of the present disclosure.
Figure 21:
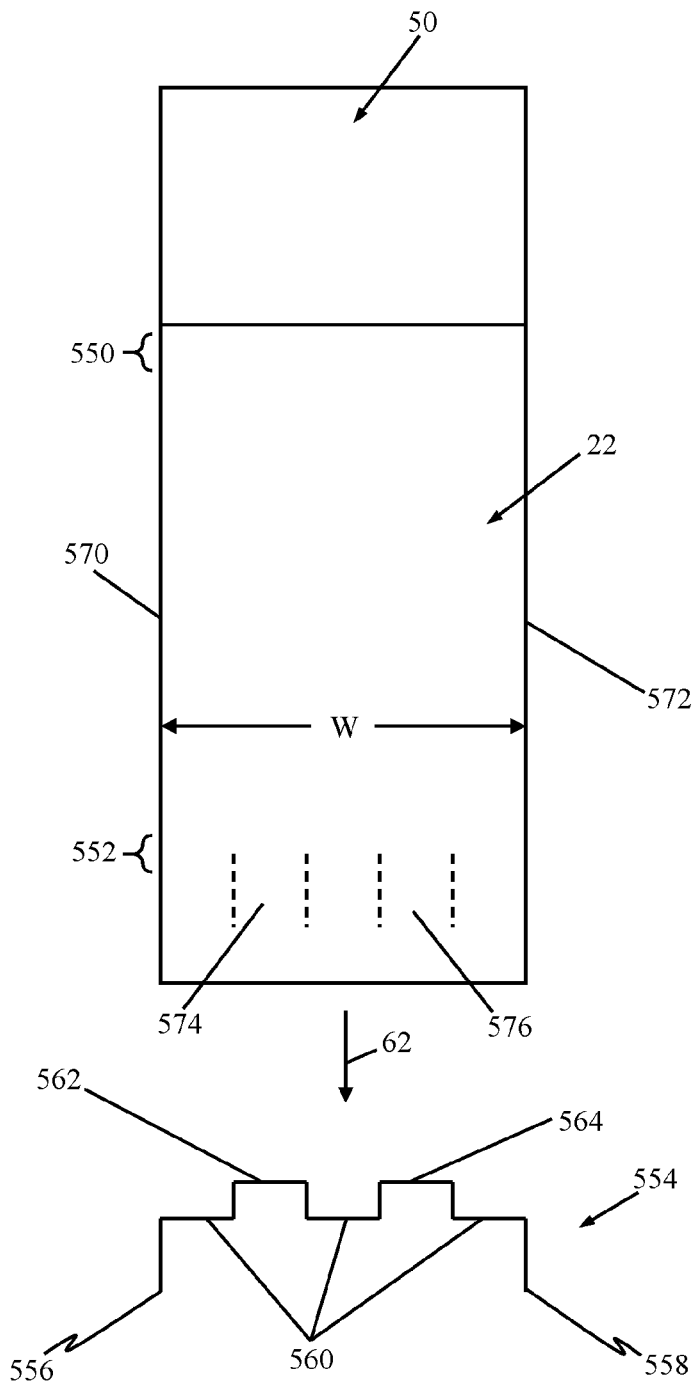
FIGS. 21-24 illustrate steps of the method of FIG. 20.

FIG. 20 comprises a block diagram that illustrates an aspect of a method of the present disclosure of controlling a thickness of a substrate, such as the glass ribbon 22. At step 500, a thickness of the substrate across the width of the substrate (e.g., a thickness profile) is measured, determined or estimated. For example, and with additional reference to FIG. 21 that otherwise illustrates the glass ribbon 22 being formed at the forming body 50 and being drawn in the direction 62, a thickness profile of the glass ribbon 22 across the width W of the glass ribbon 22 can be measured, determined or estimated at a location downstream of where the elongated laser beam (not shown) will be applied. In FIG. 21, the expected location of the elongated laser beam is designated generally at 550, and one possible location of the thickness measurement is designated generally at 552. In some embodiments, a thickness measurement trace can be carried out on the glass ribbon 22 for the purpose of identifying thickness non-uniformities that are present in the glass ribbon 22. Also by way of example, the thickness profile of the glass ribbon 22 can be monitored in real time as the glass ribbon 22 is produced. The monitoring or determination of the thickness of the glass ribbon 22 can be accomplished with various techniques known in the art, such as interference measurement, chromatic confocal measurement, white light topography, white light interferometry, etc. Where the substrate in question is a material other than a glass ribbon, other thickness measurement techniques can alternatively be employed that are appropriate for the particular composition and/or format of the substrate.

The so-determined thickness trace or profile is signaled to the controller 154 (FIG. 2) at step 502. The controller 154 can be programmed to analyze the thickness profile. In some embodiments, any segments of elevated thickness in the thickness profile can be identified (e.g., a thickness exceeding a pre-determined absolute value; a thickness at one segment that exceeds the thickness at other segments by a pre-determined value or percentage, etc.), and the location (and optionally the size) of the identified segment(s) can be correlated with an area or areas of the glass ribbon 22 across the width W of the glass ribbon 22. By way of non-limiting example, a hypothetical thickness trace or profile 554 generated at the measurement location 552 is shown in FIG. 21. The thickness trace 554 terminates at a start point 556 and an end point 558. The thickness trace 554 can be interpreted as exhibiting segments of acceptable thickness 560, and first and second segments of elevated thickness 562, 564. As a point of reference, the start point 556 corresponds with a first edge 570 of the glass ribbon 22, and the end point 558 corresponds with an opposing, second edge 572. The first and second segments of elevated thickness 562, 564 in the thickness trace 554 correspond with first and second targeted areas 574, 576 (drawn with imaginary lines in FIG. 21) across the width W of the glass ribbon 22 (e.g., where the first segment of elevated thickness 562 initiates 10 millimeters (mm) from the start point 556, the first targeted areas 574 initiates 10 mm from the first edge 570 in the direction of the width W). Based on the above analyses, the first and second targeted areas 574, 576 can be designated or selected as benefitting from a reduction in thickness. All other areas of the glass ribbon 22 across the width W (i.e., other than the first and second targeted areas 574, 576) can be designated or selected as not requiring a reduction in thickness.

Figure 22:
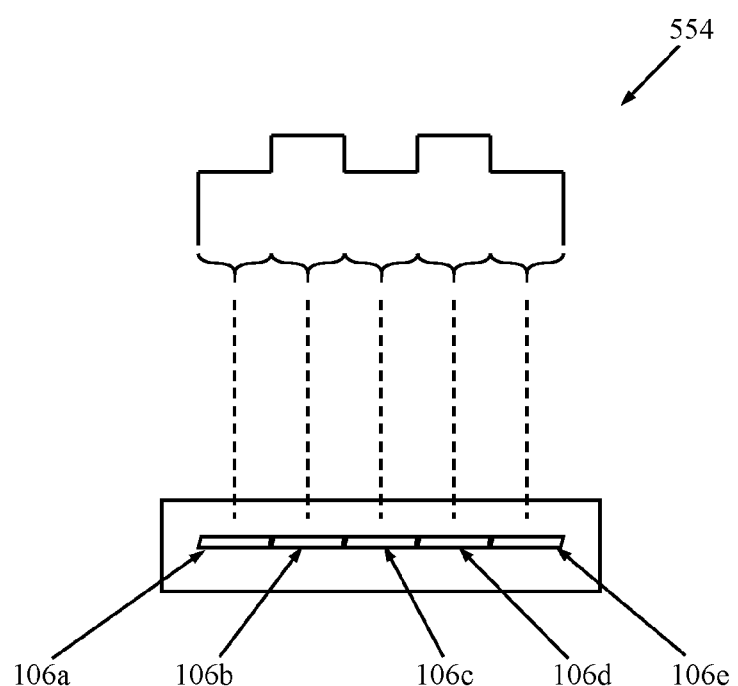

At step 504, the controller 154 operates to configure the shielding assembly in accordance with the identifications made at step 502. By way of non-limiting example and with additional reference to the exemplary shielding assembly 102 of FIGS. 6A-6C, the serial arrangement of the shields 106a-106e can correlate with the width W of the glass ribbon 22, including the first shield 106a corresponding with the first edge 570 (i.e., presence or absence of the first shield 106a in the optical path of the elongated laser beam 34 will affect an optical intensity of the elongated laser beam 34 at the first edge 570), and the fifth shield 106e corresponding with the second edge 572. Because the shields 106a-106e have given or known dimensions, a relationship of each of the shields 106a-106e relative to a corresponding portion of the glass ribbon 22 across the width W can be determined. Additionally or alternatively, a correlation of each of the shields 106a-106e relative to the measured thickness profile or trace is also known or can be determined. For example, FIG. 22 illustrates a relationship between the shields 106a-106e and the thickness trace 554; as shown, each of the shields 106a-106e corresponds with a different segment of the thickness trace 554. From one or both of these relationships, a determination can then be made as to how the shields 106a-106e should be arranged relative to the optical path in order to effectuate a thickness reduction at selected portions of the glass ribbon 22. Continuing the above hypothetical, and returning to FIGS. 6A-6C and 21, it can be determined that relative to the width W of the glass ribbon 22, the second shield 106b corresponds with the first targeted area 574, and the fourth shield 106d corresponds with the second targeted area 576. Alternatively or in addition, it can be determined that relative to the thickness trace 554, the second shield 106b corresponds with the first segment of elevated thickness 562, and the fourth shield 106d corresponds with the second segment of elevated thickness 564. Based on one or both of these determinations, the shielding assembly 102 is configured at step 504 (e.g., the controller 154 operates the actuators 152) such that the second and fourth shields 106b, 106d are removed from the optical path, and the first, third and fifth shields 106a, 106c, 106e are inserted into the optical path (i.e., the arrangement of FIG. 6C).

At step 506, the control apparatus is operated to emit the elongated laser beam 34 with a targeted intensity profile onto the glass ribbon 22. The targeted intensity profile is dictated by the shielding assembly as configured at step 504. Continuing the above hypothetical, the elongated laser beam 34 is shown as impinging upon the glass ribbon 22 in FIG. 23. The targeted intensity profile of the elongated laser beam 34 is represented by a trace 580, and includes a first region of elevated intensity 582, a second region of elevated intensity 584, and regions of reduced intensity 586 (e.g., minimal or zero laser beam energy). The first and second regions of elevated intensity 582, 584 are also schematically shown in the depiction of the elongated laser beam 34. The first and second regions of elevated intensity 582, 584 correspond with the first and second targeted areas 574, 576, respectively, relative to the width W of the glass ribbon 22. In other words, a location of the first region of elevated intensity 582 relative to the first edge 570 (or any other point of reference along the width W) can be the same as a location of the first targeted area 574 relative to the first edge 570, and a location of the second region of elevated intensity 584 relative to the first edge 570 can be the same as a location of the second targeted area 576. At the remaining regions 586 of the targeted intensity profile 580, an optical intensity of the elongated laser beam 34 at the glass ribbon 22 is minimal or zero (i.e., where the elongated laser beam 34 has been blocked by the first, third and fifth shields 106a, 106c, 106e). As a result, laser beam energy sufficient to raise a temperature and reduce a viscosity of the glass ribbon 22 is applied at selected portions of the glass ribbon 22 that otherwise correspond with the first and second targeted areas 574, 576.

Figure 23:
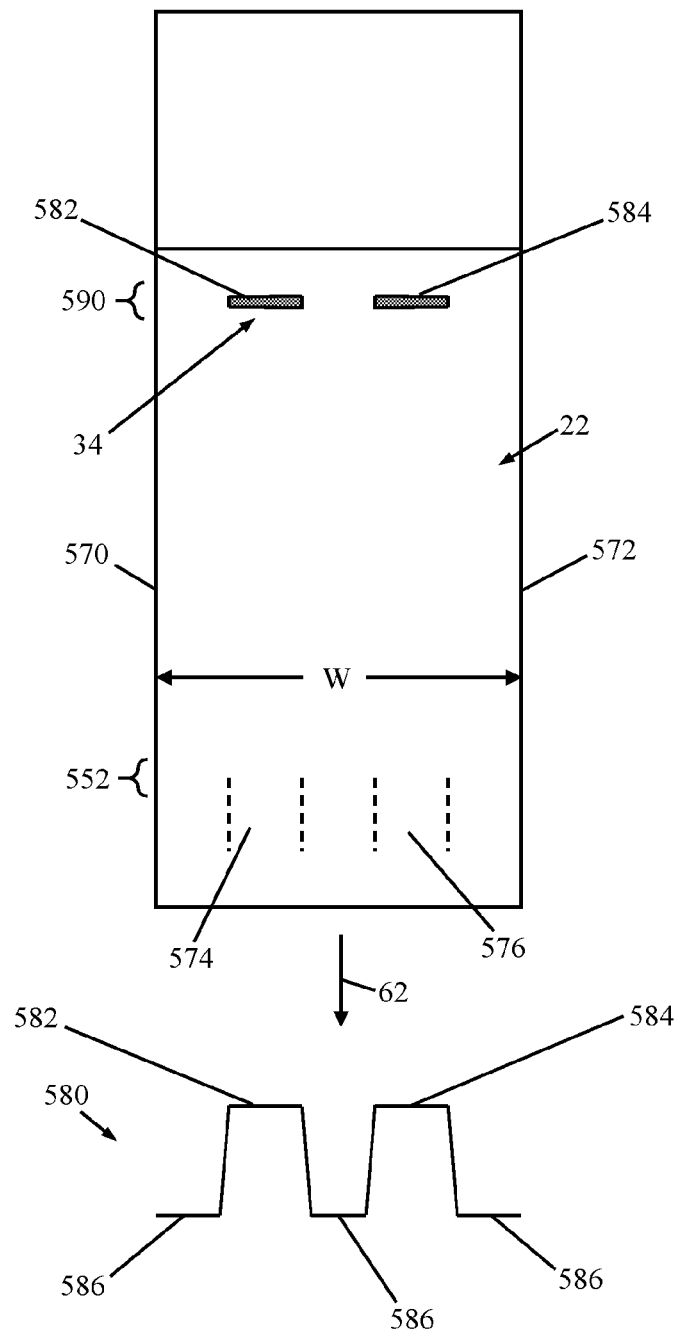
Figure 24:
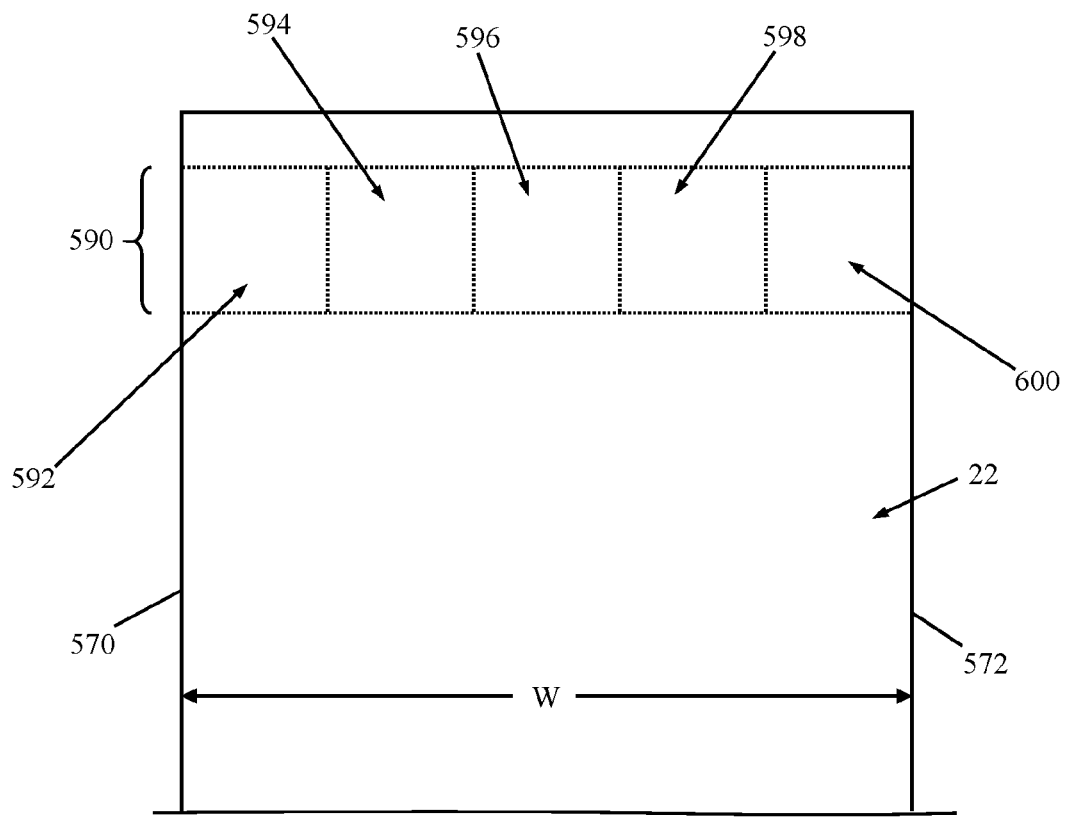

More particularly, a laser beam zone 590 can be designated along the glass ribbon 22 and at which the elongated laser beam 34 is applied. The laser beam zone 590 encompasses the entire width W of the glass ribbon 22, and can be considered as comprising a series of consecutive portions from the first edge 570 to the second edge 572. By way of further explanation, FIG. 24 identifies hypothetical first, second, third, fourth and fifth portions 592-600 extending in the direction of the width W across the laser beam zone 590. With reference between FIGS. 23 and 24, impingement of the elongated laser beam 34 on the glass ribbon 22 can be described as including the first region of elevated intensity 582 being aligned with and applying laser energy to the second portion 594, the second region of elevated intensity 584 being aligned with and applying laser to the fourth portion 598, and the regions of reduced intensity 586 being aligned with respective ones of the first, third and fifth portions 592, 596, 600. It will be understood that in some embodiments, the regions of reduced intensity 586 are characterized by the complete absence of any laser energy or laser power; under these circumstances, no laser energy is applied to the first, third and fifth portions 592, 596, 600. The illustration of the elongated laser beam 34 in FIG. 23 schematically reflects this scenario. In other embodiments, some minimal level of laser energy may be applied. Regardless, with the example of FIGS. 23 and 24, the second and fourth portions 594, 598 constitute portions of the glass ribbon 22 preselected to receive laser beam energy sufficient to raise a temperature and reduce a viscosity of the glass ribbon 22. The reduction in viscosity can result in a reduction in thickness at the preselected portions 594, 598. The remaining portions 592, 596, 600 of the laser beam zone 590 do not receive laser beam energy sufficient to raise a temperature and reduce a viscosity of the glass ribbon 22 in response to application of the elongated laser beam 34 onto the glass ribbon 22.

It will be understood that the above hypothetical is but one of a plethora of different substrate thickness non-uniformity scenarios that can be addressed or controlled by the methods and apparatuses of the present disclosure. In more general terms, a targeted intensity profile appropriate for addressing a particular thickness profile across the width W of the glass ribbon 22 can be imparted into the elongated laser beam 34 by a corresponding arrangement of the shielding assembly. In this regard, a resolution or precision of the size and location (relative to the width W) of the region(s) of elevated intensity in the targeted intensity profile can be a function of the number, size and spatial articulation of the shields provided with the shielding assembly. Regardless, the elongated laser beam 34 can remain stationary relative to the glass ribbon 22. With embodiments in which the glass ribbon 22 (or other substrate) is moving, such as when the glass ribbon 22 is being continuously drawn in the direction 62, the area of the glass ribbon 22 acted upon by the elongated laser beam 34 will eventually reach the location 552 at which thickness is being measured. The corresponding, updated thickness trace may no longer exhibit segments of elevated thickness. In other scenarios, the updated thickness trace may exhibit one or more segments of elevated thickness. The controller 154 (or other computer controlling operation of the controller 154) can continuously receive the updated thickness traces and can be programmed to operate an appropriate closed-loop control algorithm to effect a new configuration of the shielding assembly, and thus a new targeted intensity profile in the elongated laser beam 34.

While the methods of FIG. 20 implicate automated control over an arrangement of the shields provided with the shielding assembly. In other embodiments, an operator can manually arrange the shields based upon, for example, thickness information. Regardless, the control apparatuses and methods of the present disclosure are well-suited for addressing thickness non-uniformities in a substrate, such as part of the production of a glass ribbon in a draw operation (or other glass ribbon formation techniques).

Figure 25:
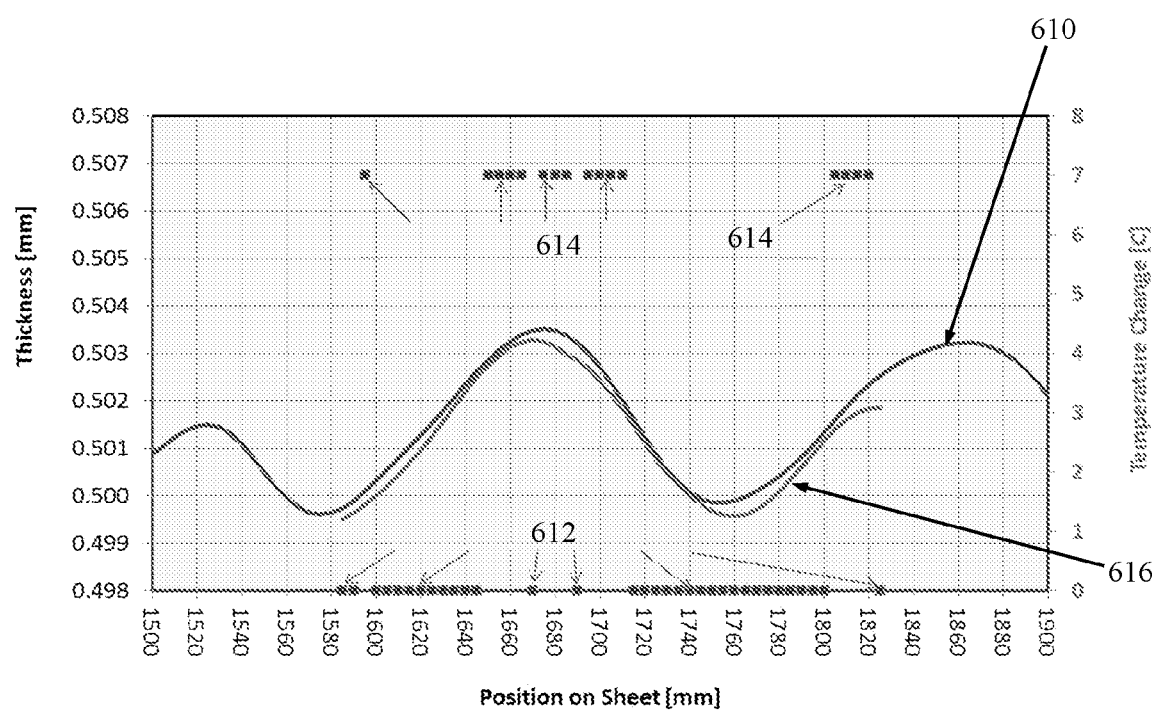
FIG. 25 is a plot of data generated by a simulation of substrate thickness control in accordance with principles of the present disclosure.

For example, FIG. 25 presents the results of a simulation in which an elongated laser beam with a targeted intensity profile impinges upon a glass ribbon (or "sheet") with thickness non-uniformities. Thickness plot line 610 represents the thickness of the glass ribbon at various locations across the width. As a point of reference, the "Position on Sheet" axis in FIG. 25 presents incremental distances from an edge of the glass sheet in the width direction, starting with a location 1500 mm from the edge and ending at a location 1900 mm from the edge. In the representation of FIG. 25, the thickness plot line 610 shows that prior to the application of the elongated laser beam, the glass ribbon has one area of elevated thickness between approximately 1650 mm and approximately 1710, and another area of elevated thickness initiating at approximately 1800 mm. The simulation assumed that an elongated laser beam could be applied to the glass ribbon, and arranged such that a left-most outer extent of the elongated laser beam would impinge on the glass ribbon at a location of approximately 1585 mm, and a right-most outer extent of the elongated laser beam would impinge on the glass ribbon at a location of approximately 1825 mm (i.e., the elongated laser beam has a width of approximately 240 mm). It was further assumed that a laser energy density of the elongated laser beam was sufficient to raise the temperature of the glass by 7 degrees Celsius (° C.), and that a temperature of the thickest part of the thickness profile of the glass ribbon can be raised by 4° C. in order to effect a change in thickness approximately matching the thinnest part of the thickness profile. To simulate shielding of portions of the elongated laser beam, the glass ribbon was divided into 5 mm sections that were either open or closed to the incident energy of the elongated laser beam. Sections closed to the incident energy (i.e., representing portions of the elongated laser beam that were blocked by a shield) are identified at 612; sections open to the incident energy (i.e., representing portions of the elongated laser beam that impinged upon the glass ribbon) are identified at 614. The glass ribbon did not experience a temperature change at the closed sections 612, and experienced a 7° C. temperature increase at the open sections 614. By patterning the closed and open sections 612, 614 as shown, the simulation generated an effective temperature change across a portion of the width of the glass ribbon, represented by temperature change plot line 616. As shown, the temperature change plot line 616 mimics the corresponding region of the thickness plot line 610, illustrating that an elongated laser beam distributing uniform energy density across the glass ribbon can be intermittently "blocked" so as to create a temperature change profile that will act to cancel existing thickness non-uniformities.

From the foregoing explanations, it is expected that glass manufacturing systems (e.g., downdraw glass forming apparatus) implementing the control apparatuses and methods of the present disclosure when utilized with the manufacture of glass are capable of producing glass with a thickness uniformity of less than 1 micrometer deviation in thickness over 100 mm distance.

Various modifications and variations can be made to the embodiments described herein without departing from the scope of the claimed subject matter. Thus it is intended that the specification cover the modifications and variations of the various embodiments described herein provided such modifications and variations come within the scope of the appended claims and their equivalents.

What is claimed is:

1. A control apparatus configured to control a thickness of at least a portion of a glass ribbon in a viscous state, the control apparatus comprising:
a laser assembly configured to generate an elongated laser beam, wherein the elongated laser beam travels in a propagation direction along an optical path to interact with the glass ribbon in the viscous state, the elongated laser beam having a shape in a plane perpendicular to the propagation direction, wherein the shape is non-circular so as to define a major axis that extends along at least an entire width of the glass ribbon; and
a shielding assembly comprising a first shield selectively disposed in the optical path and configured to decrease an optical intensity of a region of the elongated laser beam;
wherein the shielding assembly is configured to change an intensity profile of the elongated laser beam across the major axis from an initial intensity profile to a targeted intensity profile prior to interacting with the glass ribbon in the viscous state;
wherein the shape of the elongated laser beam includes a minor axis perpendicular to the major axis, wherein a length of the major axis compared to a length of the minor axis has an aspect ratio of at least 4:1.

2. The control apparatus of claim 1, wherein the targeted intensity profile comprises a first region and a second region, and further wherein an optical intensity of the second region is less than an optical intensity of the first region.

3. The control apparatus of claim 2, wherein the optical intensity of the second region is at least 10 times less than the optical intensity of the first region.

4. The control apparatus of claim 3, wherein the targeted intensity profile further comprises a third region, the second region being between the first and third regions relative to the major axis, and further wherein the optical intensity of the second region is at least 10 times less than the optical intensity of the third region.

5. The control apparatus of claim 3, wherein the optical intensity of the second region is approximately 0 W/mm$^2$.

6. The control apparatus of claim 1, wherein the laser assembly comprises a laser source configured to emit a laser beam and further comprises optics configured to alter a shape of the emitted laser beam.

7. The control apparatus of claim 1, wherein the shielding apparatus further comprises a controller linked to the first shield and operable to selectively move the first shield into and out of the optical path.

8. The control apparatus of claim 1, wherein the first shield is configured to block a region of the shaped laser beam when disposed in the optical path.

9. The control apparatus of claim 1, wherein a shape of the first shield defines a major plane, and further wherein the major plane of the first shield is substantially perpendicular to the propagation direction when the first shield is disposed in the optical path.

10. The control apparatus of claim 1, wherein a shape of the first shield defines a major plane, and further wherein the major plane of the first shield is non-perpendicular relative to the propagation direction when the first shield is disposed in the optical path.

11. The control apparatus of claim 1, wherein the shielding assembly further comprises a second shield selectively disposed in the optical path and configured to decrease an optical intensity of a portion of the elongated laser beam, and further wherein the shielding assembly is configured such that when the first and second shields are both disposed in the optical path, the first shield affects a region of the elongated laser beam differing from a region of the elongated laser beam affected by the second shield.

12. The control apparatus of claim 1, wherein the major axis of the shape of the elongated laser beam defines a length within the range of 60-1000 mm.

13. A control apparatus configured to control a thickness of at least a portion of a glass ribbon in a viscous state, the control apparatus comprising:
an infrared laser assembly configured to generate an elongated laser beam with a wavelength from about 1 micrometer to about 11 micrometers, wherein the elongated laser beam travels in a propagation direction along an optical path to interact with the glass ribbon in the viscous state, the elongated laser beam having a shape in a plane perpendicular to the propagation direction, wherein the shape is non-circular so as to define a major axis that extends along at least an entire width of the glass ribbon wherein the shape of the elongated laser beam includes a minor axis perpendicular to the major axis, wherein a length of the major axis compared to a length of the minor axis has an aspect ratio of at least 4:1; and
a shielding assembly comprising a first shield selectively disposed in the optical path and configured to decrease an optical intensity of a region of the elongated laser beam;
wherein the shielding assembly is configured to change an intensity profile of the elongated laser beam across the shape from an initial intensity profile to a targeted intensity profile prior to interacting with the glass ribbon in the viscous state.

14. The control apparatus of claim 13, wherein the infrared laser assembly comprises two or more infrared laser generators configured to combine emissions to form the elongated laser beam.

15. The control apparatus of claim 13, wherein the infrared laser assembly is configured to generate the elongated laser beam with a wavelength from approximately 9.4 micrometers to approximately 10.6 micrometers.

16. The control apparatus of claim 13, wherein the infrared laser assembly comprises an carbon dioxide laser generator.

17. A control apparatus configured to control a thickness of at least a portion of a glass ribbon in a viscous state, the control apparatus comprising:
an infrared laser assembly configured to generate an elongated laser beam, wherein the elongated laser beam travels in a propagation direction along an optical path to interact with the glass ribbon in the viscous state, the elongated laser beam having a shape in a plane perpendicular to the propagation direction, wherein the shape is non-circular so as to define a major axis that extends along at least an entire width of the glass ribbon wherein the shape of the elongated laser beam includes a minor axis perpendicular to the major axis, wherein a length of the major axis compared to a length of the minor axis has an aspect ratio of at least 4:1; and
a shielding assembly comprising a first shield selectively disposed in the optical path and configured to decrease an optical intensity of a region of the elongated laser beam, wherein the first shield is formed of a material configured to at least partially block, absorb, or scatter energy from the region of the elongated laser beam so as to decrease the optical intensity of the elongated laser beam;

wherein the shielding assembly is configured to change an intensity profile of the elongated laser beam across the shape from an initial intensity profile to a targeted intensity profile prior to interacting with the glass ribbon in the viscous state.

18. The control apparatus of claim 17, wherein the first shield is formed of a metal, ceramic, or composite material configured to at least partially block, absorb, or scatter energy from the region of the elongated laser beam.

19. The control apparatus of claim 17, wherein the shielding assembly further comprises a second shield selectively disposed in the optical path adjacent to the first shield such that at least a portion of the second shield overlaps with the first shield relative to the optical path, wherein the second shield is formed of a material configured to at least partially block, absorb, or scatter energy from a second region of the elongated laser beam so as to decrease the optical intensity of the elongated laser beam.

* * * * *